US010528259B2

(12) United States Patent
Lee et al.

(10) Patent No.: US 10,528,259 B2
(45) Date of Patent: Jan. 7, 2020

(54) STORAGE DEVICE, USER DEVICE INCLUDING STORAGE DEVICE, AND OPERATION METHOD OF USER DEVICE

(71) Applicant: Samsung Electronics Co., Ltd., Suwon-si, Gyeonggi-do (KR)

(72) Inventors: Youngmin Lee, Seoul (KR); Ji-Seung Youn, Seoul (KR); Sungho Seo, Seoul (KR); Hyuntae Park, Suwon-si (KR); Hwaseok Oh, Yongin-si (KR); JinHyeok Choi, Yongin-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 207 days.

(21) Appl. No.: 15/681,574

(22) Filed: Aug. 21, 2017

(65) Prior Publication Data

US 2018/0081556 A1 Mar. 22, 2018

(30) Foreign Application Priority Data

Sep. 22, 2016 (KR) .................. 10-2016-0121582

(51) Int. Cl.
*G06F 3/06* (2006.01)
*G06F 12/02* (2006.01)

(52) U.S. Cl.
CPC .......... *G06F 3/0607* (2013.01); *G06F 3/061* (2013.01); *G06F 3/064* (2013.01); *G06F 3/0661* (2013.01); *G06F 3/0683* (2013.01); *G06F 12/0246* (2013.01); *G06F 2212/7201* (2013.01); *G06F 2212/7202* (2013.01); *G06F 2212/7203* (2013.01); *G06F 2212/7207* (2013.01)

(58) Field of Classification Search
CPC ........ G06F 3/0607; G06F 3/061; G06F 3/064; G06F 3/0658; G06F 3/0661; G06F 3/0683; G06F 3/0688; G06F 12/00; G06F 12/109
USPC .................. 711/103, 202, 203, 206, 209
See application file for complete search history.

(56) References Cited

U.S. PATENT DOCUMENTS

| 7,890,550 | B2 | 2/2011 | Jung et al. |
| 8,539,143 | B2 | 9/2013 | Choi et al. |
| 9,092,362 | B1 | 7/2015 | Alcantara et al. |
| 9,164,891 | B2 | 10/2015 | Karamcheti et al. |
| 2013/0042050 | A1* | 2/2013 | Thomas ............... G06F 12/0246 711/103 |
| 2013/0100736 | A1* | 4/2013 | Hou ....................... G11C 16/08 365/185.05 |
| 2014/0108703 | A1* | 4/2014 | Cohen .................. G06F 3/0616 711/103 |
| 2014/0122777 | A1 | 5/2014 | Oh et al. |
| 2015/0074328 | A1* | 3/2015 | Baryudin .............. G06F 3/0616 711/103 |

(Continued)

*Primary Examiner* — Gary J Portka
(74) *Attorney, Agent, or Firm* — Harness, Dickey & Pierce, P.L.C.

(57) ABSTRACT

Disclosed is a storage device which includes a nonvolatile memory device and a controller. The controller communicates with a host through a first port, communicates with an external storage device through a second port, and controls the nonvolatile memory device based on first mapping information. The controller is configured to receive second mapping information from the external storage device, receive first write data from the host and to selectively transmit first write data to the external storage device based on the second mapping information.

20 Claims, 14 Drawing Sheets

(56) References Cited

U.S. PATENT DOCUMENTS

2015/0127889 A1    5/2015   Hwang
2015/0331624 A1   11/2015   Law
2015/0378888 A1   12/2015   Zhang et al.
2016/0012024 A1    1/2016   Jayaraman et al.
2016/0042810 A1    2/2016   Lee et al.
2016/0127851 A1    5/2016   Baek et al.

* cited by examiner

STORAGE DEVICE, USER DEVICE INCLUDING STORAGE DEVICE, AND OPERATION METHOD OF USER DEVICE

CROSS-REFERENCE TO RELATED APPLICATIONS

A claim for priority under 35 U.S.C. § 119 is made to Korean Patent Application No. 10-2016-0121582 filed Sep. 22, 2016, in the Korean Intellectual Property Office, the entire contents of which are hereby incorporated by reference.

BACKGROUND

Example embodiments of the inventive concepts described herein relate to a semiconductor memory, and more particularly, to a storage device, a user device including the storage device, and an operating method of the user device.

Semiconductor memory devices may be classified into volatile memory devices, which lose data stored therein at power-off, such as a static random access memory (SRAM), a dynamic RAM (DRAM), and a synchronous DRAM, and nonvolatile memory devices, which retain data stored therein even at power-off, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

Flash memory devices are being widely used as mass storage in computing systems. A flash memory-based large-capacity storage medium uses a buffer memory, such as a DRAM or an SRAM, to compensate for a difference between a program speed of the flash memory device and an interfacing speed of the computing system. However, since the buffer memory occupies a large area of the storage medium, to increase the capacity of the buffer memory causes an increase in costs. Accordingly, there is a need for devices or methods for reducing the size of the buffer memory and improving the performance of the large-capacity storage medium.

SUMMARY

Example embodiments of the inventive concepts provide a storage device having improved performance and improved lifespan, a user device including the storage device, and an operating method of the user device.

According to an aspect of an example embodiment, a storage device includes a nonvolatile memory device and a controller. The controller communicates with a host through a first port, communicates with an external storage device through a second port, and controls the nonvolatile memory device based on first mapping information. The controller is configured to receive second mapping information from the external storage device, receive first write data from the host and to selectively transmit first write data to the external storage device based on the second mapping information.

According to another aspect of an example embodiment, a user device includes a host. A first storage device is configured to communicate with the host through first ports, and a second storage device is configured to communicate with the first storage device through second ports. The first storage device is configured to receive first write data from the host and to transmit the received first write data to the second storage device. The second storage device is configured to store the received first write data, and the first write data are data to be stored in the first storage device by a request of the host.

According to another aspect of an example embodiment, an operating method of a user device that includes a host and first and second storage devices includes receiving, at the first storage device, first write data from the host, transferring, at the first storage device, the received first write data to the second storage device, storing, at the second storage device, the first write data, reading, at the first storage device, the first write data stored in the second storage device, and storing, at the first storage device, the read first write data.

A storage system comprising: a first storage device and a second storage device. The first storage device including, a first nonvolatile memory device, and a first controller. The first controller is configured to, control the first nonvolatile memory device based on first mapping information, receive second mapping information, receive first write data, and selectively transmit the first write data based on the second mapping information. The second storage device includes a second nonvolatile memory device, and a second controller. The second controller is configured to control the second nonvolatile memory device based on the second mapping information, transmit second mapping information to the first storage device, and receive first write data selectively transmitted by the first storage device based on the second mapping information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, Example embodiments of the inventive concepts may be described in detail and clearly to such an extent that one having ordinary skill in the art may easily implement the inventive concepts.

Figure 1:
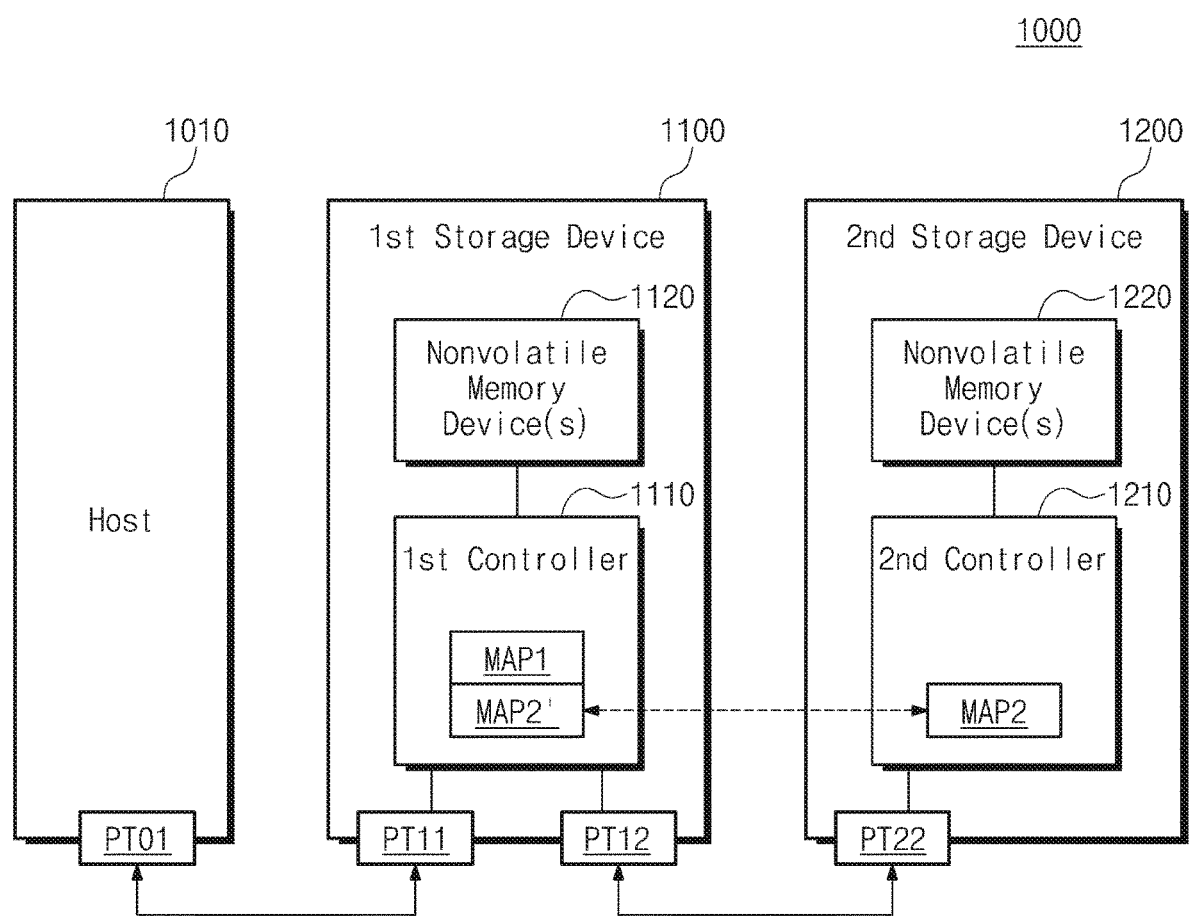
FIG. 1 is a block diagram illustrating a user device, according to an example embodiment of the inventive concepts.

FIG. 1 is a block diagram illustrating a user device, according to an example embodiment of the inventive concepts. Referring to FIG. 1, a user device 1000 may include a host 1010 and first and second storage devices 1100 and 1200. In an example embodiment, the user device 1000 may be a computing system, such as a computer, a notebook, a server, a workstation, a portable communication terminal, a personal digital assistant (PDA), a portable multimedia player (PMP), a smartphone, or a wearable device.

The host 1010 may perform various arithmetic operations for driving various application programs of the user device 1000. In an example embodiment, the host 1010 may be an information processing device such as a central processing unit (CPU) or an application processor (AP).

The host 1010 may store data in the first or second storage device 1100 or 1200 or may read the stored data therefrom. The host 1010 may perform the above-described write or read operation based on a predefined interface.

In an example embodiment, the predefined interface may include at least one of various communication interfaces such as, but not limited to, a double data rate (DDR) interface, a universal serial bus (USB) interface, a multimedia card (MMC) interface, an eMMC (embedded MMC) interface, a peripheral component interconnection (PCI) interface, a PCI-express (PCI-E) interface, an advanced technology attachment (ATA) interface, a serial-ATA interface, a parallel-ATA interface, a small computer small interface (SCSI), an enhanced small disk interface (ESDI), an integrated drive electronics (IDE) interface, Firewire, a universal flash storage (UFS) interface, and a nonvolatile memory express (NVMe) interface.

The first storage device 1100 may include a first controller 1110 and a first nonvolatile memory device 1120. Under control of the host 1010, the first controller 1110 may store data received from the host 1010 in the first nonvolatile memory device 1120 or may output data stored in the first nonvolatile memory device 1120 thereto. Under control of the first controller 1110, the first nonvolatile memory device 1120 may store data or may output the stored data.

The second storage device 1200 may include a second controller 1210 and a second nonvolatile memory device 1220. Under control of the host 1010, the second controller 1210 may store data received from the host 1010 in the second nonvolatile memory device 1220 or may output data stored in the second nonvolatile memory device 1220 thereto. Under control of the second controller 1210, the second nonvolatile memory device 1220 may store data or may output the stored data.

In an example embodiment, each of the first and second nonvolatile memory devices 1120 and 1220 may include a plurality of memory dies, a plurality of memory chips, or a plurality of memory packages. In an example embodiment, each of the first and second nonvolatile memory devices 1120 and 1220 may include a nonvolatile memory such as a NAND flash memory. However, Example embodiments of the inventive concepts are not limited thereto. For example, each of the first and second nonvolatile memory devices 1120 and 1220 may include a nonvolatile memory such as a ROM, a PROM, an EPROM, an EEPROM, a flash memory device, a PRAM, a MRAM, a RRAM, or a FRAM.

In an example embodiment, the host 1010 may be directly connected with the first storage device 1100 to communicate therewith. For example, the host 1010 and the first storage device 1100 may directly communicate with each other through first ports PT01 and PT11. That is, the host 1010 may provide the first storage device 1100 with information, such as a command for controlling the first storage device 1100, control information, and write data, through the first ports PT01 and PT11, and the first storage device 1100 may provide the host 1010 with information, such as status information and read data, through the first ports PT01 and PT11.

In an example embodiment, the second storage device 1200 may be indirectly connected with the host 1010 to communicate therewith. For example, as described above, the host 1010 and the first storage device 1100 may be directly connected with each other through the first ports PT01 and PT11. The second storage device 1200 may be directly connected with the first storage device 1100 through second ports PT12 and PT22. The host 1010 may provide the first storage device 1100 with information, such as a command for controlling the second storage device 1200, control information, and write data, through the first ports PT01 and PT11, and the first storage device 1100 may transmit the information provided from the host 1010 to the second storage device 1200 through the second ports PT12 and PT22.

Likewise, the second storage device 1200 may provide the first storage device 1100 with information, such as status information and read data, through the second ports PT12 and PT22, and the first storage device 1100 may transmit the information received through the first ports PT12 and PT22 to the host 1010 through the second ports PT01 and PT11. That is, the first storage device 1100 may be configured to perform an information transfer role between the host 1010 and the second storage device 1200.

As described above, the host 1010, the first storage device 1100, and the second storage device 1200 may be connected to each other in a chain structure or a cascade connection structure. In an example embodiment, the first storage device 1100 may be embedded storage, and the second storage device 1200 may be removable card storage. In an example embodiment, the above-described connection between the host 1010, the first storage device 1100, and the second storage device 1200 is an example, and example embodiments of the inventive concepts may not be limited thereto.

In an example embodiment, the first and second storage devices 1100 and 1200 may respectively manage data stored in the first and second nonvolatile memory devices 1120 and 1220 based on first and second mapping information MAP1 and MAP2.

For example, the first controller 1110 may manage data stored in the first nonvolatile memory device 1120 based on the first mapping information MAP1. In an example embodiment, the first mapping information MAP1 may include sector conversion information, block management information, etc. that are associated with the first nonvolatile memory device 1120. The sector conversion information may include information about a correspondence relationship between a logical address of data stored in the first nonvolatile memory device 1120 and a physical address of the first nonvolatile memory device 1120, at which the data are stored, garbage collection information of the first nonvolatile memory device 1120, wear leveling information of the first nonvolatile memory device 1120, etc. The block management information may include information about management of bad and free blocks of the first nonvolatile memory device 1120.

The second controller 1210 may manage data stored in the second nonvolatile memory device 1220 based on the second mapping information MAP2. The second mapping information MAP2 may include sector conversion information, block management information, etc. that are associated with the second nonvolatile memory device 1220. The sector conversion information included in the second mapping information MAP2 may include information about a correspondence relationship between a logical address of data stored in the second nonvolatile memory device 1220 and a physical address of the second nonvolatile memory device 1220, at which the data are stored, garbage collection information of the second nonvolatile memory device 1220, wear leveling information of the second nonvolatile memory device 1220, etc. The block management information included in the second mapping information MAP2 may include information about management of bad and free blocks of the second nonvolatile memory device 1220.

The second mapping information MAP2 may include information about a correspondence relationship between a logical address of data stored in the second nonvolatile memory device 1220 and a physical address of the second nonvolatile memory device 1220, at which the data are stored.

In an example embodiment, the first storage device 1100 may receive the second mapping information MAP2 from the second storage device 1200. For ease of description, mapping information that is provided from the second storage device 1200 and is stored in the first controller 1110 is marked with MAP2'. On the basis of the mapping information MAP2', the first storage device 1100 may store data in the second nonvolatile memory device 1220 or may read data stored in the second nonvolatile memory device 1220.

For example, the host 1010 may provide the first storage device 1100 with a first write command for storing data in the first storage device 1100 and first write data. The first write data received from the host 1010 may be temporarily stored in a data buffer (not illustrated) of the first controller 1110. An event that the first nonvolatile memory device 1120 of the first storage device 1100 is operating and an available capacity of the data buffer for storing next write data is insufficient may occur. In this case, the first controller 1110 cannot receive the next write data from the host 1010 until an operation of the first nonvolatile memory device 1120 is completed. That is, a write operation may be delayed due to a lack of capacity of the data buffer. In an example embodiment, the operation of the first nonvolatile memory device 1120 may include operations such as a program operation, an erase operation, a read operation, and a garbage collection operation.

In this case, the first controller 1110 may transmit or store the first write data stored in the data buffer to or in the second nonvolatile memory device 1220, based on the second mapping information MAP2' from the second controller 1210. For example, the first controller 1110 may transmit first write data received from the host 1010 and a second write command to the second storage device 1200. In an example embodiment, the first write data may be data to be stored in the first nonvolatile memory device 1120 by a request of the host 1010, as described above. The second write command may be a write command for storing the first write data in the second nonvolatile memory device 1220. In an example embodiment, the second write command may include a physical address of the second nonvolatile memory device 1220.

As described above, when failing to program the received first write data in the first nonvolatile memory device 1120, the first storage device 1100 may transmit the first write data and a write command to the second storage device 1200 such that the received first write data is programmed in the second storage device 1200 or the second nonvolatile memory device 1220.

According to the above-described operation, the first storage device 1100 may continue to receive write data from the host 1010 even if a capacity of the data buffer is insufficient or the first nonvolatile memory device 1120 is operating. Accordingly, since a delay of the write operation is reduced, a storage device having improved performance is provided.

In an example embodiment, the first write data stored in the second storage device 1200 may be moved to the first nonvolatile memory device 1120 under a specific condition and under control of the first storage device 1100. In an example embodiment, the specific condition may include at least one of conditions such as the case where the first and second storage devices 1100 and 1200 are at an idle state and the case where the size of first write data stored in the second storage device 1200 exceeds a given size.

Although not illustrated in FIG. 1, the second storage device 1200 may receive the first mapping information MAP1 from the first storage device 1100 and may store write data to be stored in the second nonvolatile memory device 1220 in the first nonvolatile memory device 1120 based on the received first mapping information MAP1.

In an example embodiment, the first and second controllers 1110 and 1210 may exchange the first and second mapping information MAP1 and MAP2 with each other through the second ports PT12 and PT22. Alternatively, the first and second controllers 1110 and 1210 may exchange the first and second mapping information MAP1 and MAP2 with each other through a separate signal line or a separate data path. In an example embodiment, the exchanging of mapping information may be implemented by a separate hardware circuit or by software.

Figure 2:
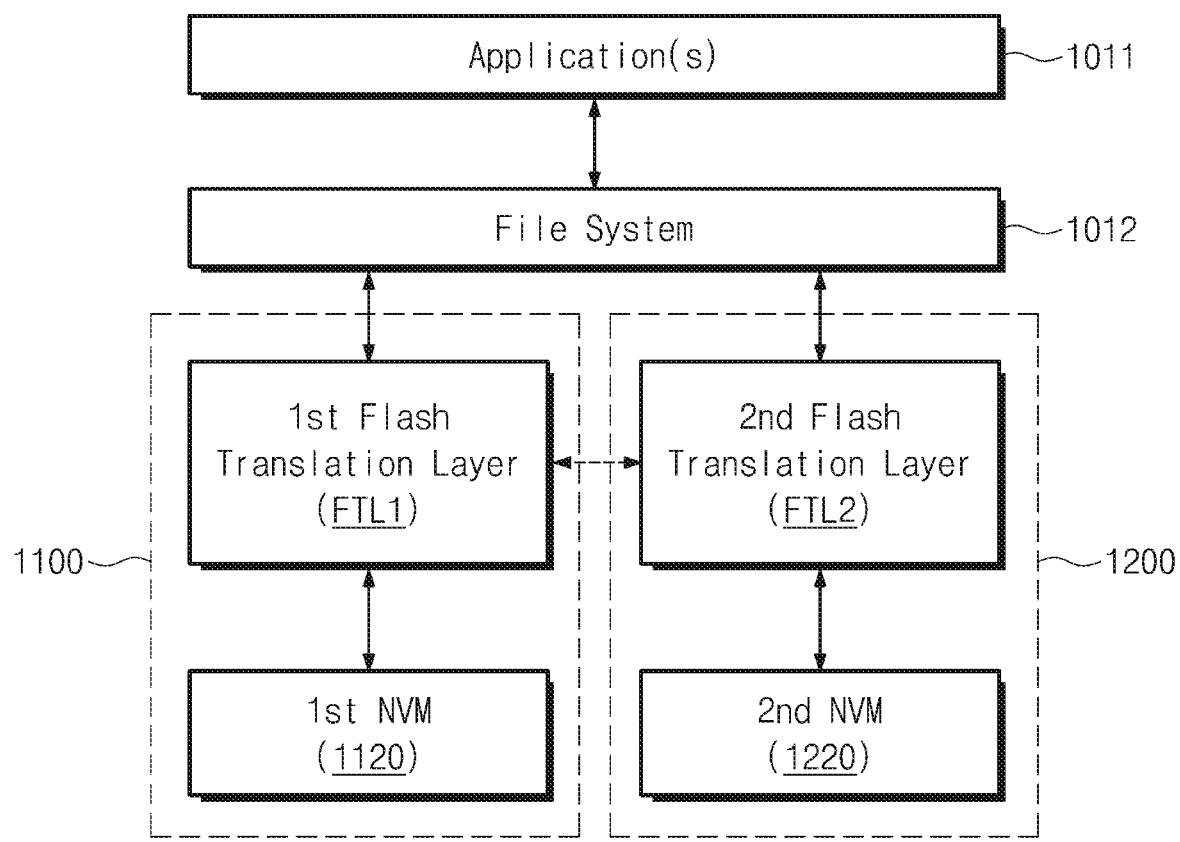
FIG. 2 is a block diagram illustrating software layers of a user device of FIG. 1.

FIG. 2 is a block diagram illustrating software layers of a user device of FIG. 1. Referring to FIGS. 1 and 2, software layers of the user device 1000 may include an application 1011, a file system 1012, a first flash translation layer FTL1, and a second flash translation layer FTL2.

The application 1011 may include an operating system or various application programs that are driven on the host 1010. The file system 1012 may organize files or data used by the application 1011 when storing the files or data in the first or second nonvolatile memory device 1120 or 1220.

For example, the file system 1012 may manage storage areas of the first and second storage devices 1100 and 1200 by using logical addresses. The file system 1012 may allocate logical addresses to data to be stored in the first and second storage devices 1100 and 1200 for management. In an example embodiment, the file system 1012 may have a type that is variable with the operating system OS of the host 1010. In an example embodiment, the file system 1012 may include FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, WinFS, or the like.

In an example embodiment, the application 1011 and the file system 1012 may be software layers driven on the host 1010.

The first and second flash translation layers FTL1 and FTL2 provide interfaces between the host 1010 and the first and second nonvolatile memory devices 1120 and 1220 such that the first and second nonvolatile memory devices 1120 and 1220 are effectively used. For example, the first flash translation layer FTL1 may perform an operation of converting a logical address managed by the file system 1012 into a physical address of the first nonvolatile memory device 1120. The second flash translation layer FTL2 may perform an operation of converting a logical address managed by the file system 1012 into a physical address of the second nonvolatile memory device 1220. In an example embodiment, the first and second flash translation layers FTL1 and FTL2 may respectively perform the above-described address conversion operation through the first and second mapping information MAP1 and MAP2.

In an example embodiment, the first flash translation layer FTL1 may perform the data exchange operation described with reference to FIG. 1, based on the second mapping information MAP2' from the second flash translation layer FTL2. For example, the first flash translation layer FTL1 may update the second mapping information MAP2' such that at least a portion of data to be stored in the first nonvolatile memory device 1120 is stored in the second nonvolatile memory device 1220. In an example embodiment, the updated second mapping information MAP2' may be provided to the second controller 1210 through the second ports PT12 and PT22 described with reference to FIG. 1 or through a separate path.

In an example embodiment, the first and second flash translation layers FTL1 and FTL2 may be software layers that are respectively driven in the first and second controllers 1110 and 1210.

In an example embodiment, for ease of illustration, the file system 1012 is illustrated as being directly and independently connected with the first and second flash translation layers FTL1 and FTL2. However, example embodiments of the inventive concepts are not limited thereto. Each of the first and second flash translation layers FTL1 and FTL2 may be connected with software layers on the host 1010 in the cascade connection structure as described with reference to FIG. 1.

Figure 3:
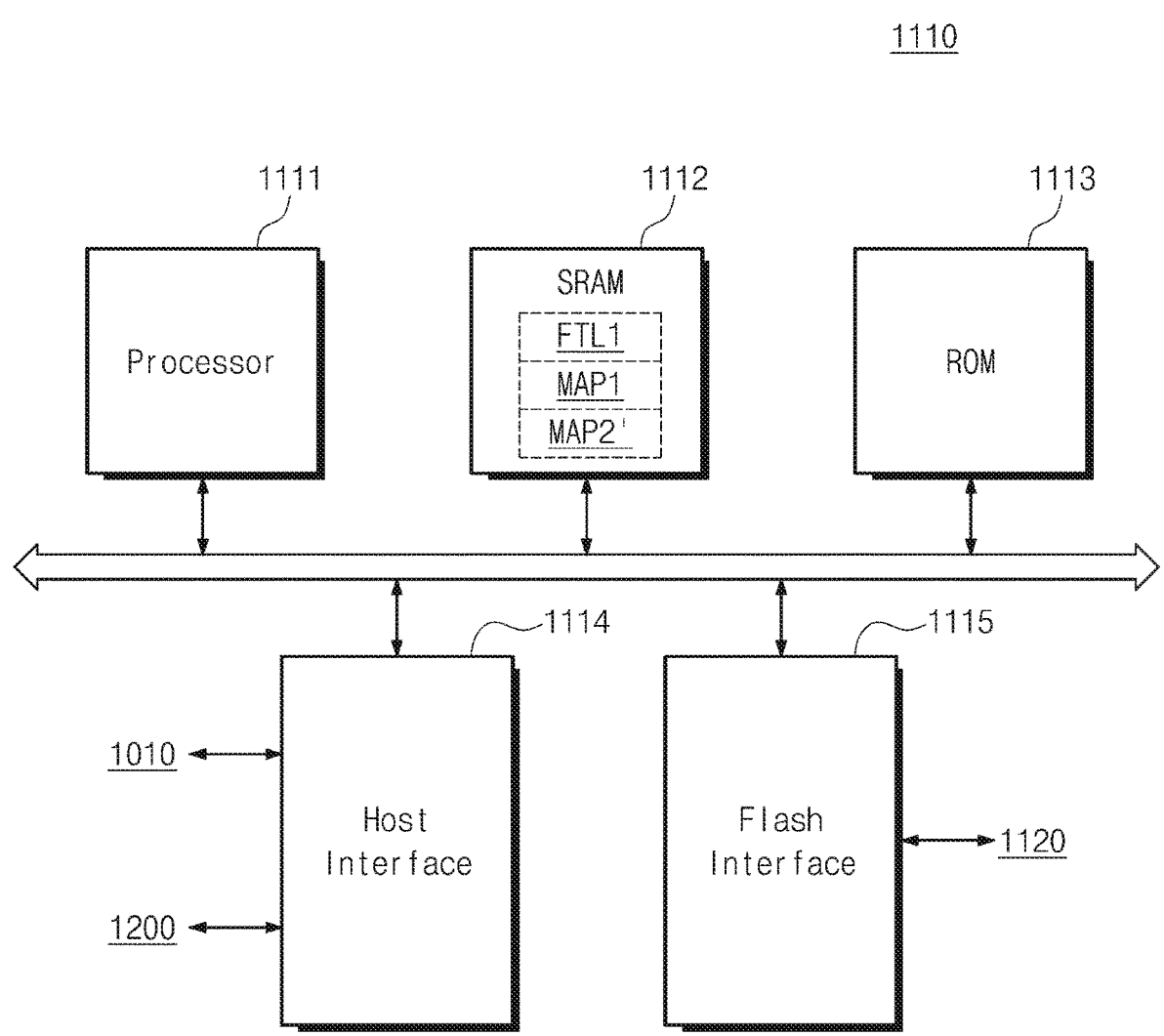
FIG. 3 is block diagram illustrating a controller of FIG. 1.

FIG. 3 is block diagram illustrating a first controller of FIG. 1. In an example embodiment, the first controller 1110 will be described with reference to FIG. 3. However, the second controller 1210 may have a structure similar to that of the first controller 1110 of FIG. 3.

Referring to FIGS. 1 to 3, the first controller 1110 may include a processor 1111, a SRAM 1112, a ROM 1113, a host interface 1114, and a flash interface 1115.

The processor 1111 may control overall operations of the first controller 1110. The SRAM 1112 may be used as a buffer memory, a cache memory, or a main memory of the first controller 1110. In an example embodiment, the SRAM 1112 may be used as a data buffer. The ROM 1113 may store a variety of information, which are needed for the first controller 1110 to operate, in the form of firmware.

In an example embodiment, the first flash translation layer FTL1 may be stored in the SRAM 1112 and may be driven by the processor 1111. In an example embodiment, the first mapping information MAP1 and the second mapping information MAP2' may be stored in the SRAM 1112 and may be managed by the first flash translation layer FTL1.

The first controller 1110 may communicate with the host 1010 and the second storage device 1200 through the host interface 1114. In an example embodiment, the host interface 1114 may be configured to perform the information transfer role described with reference to FIG. 1. The first controller 1110 may communicate with the first nonvolatile memory device 1120 through the flash interface 1115.

Figure 4:
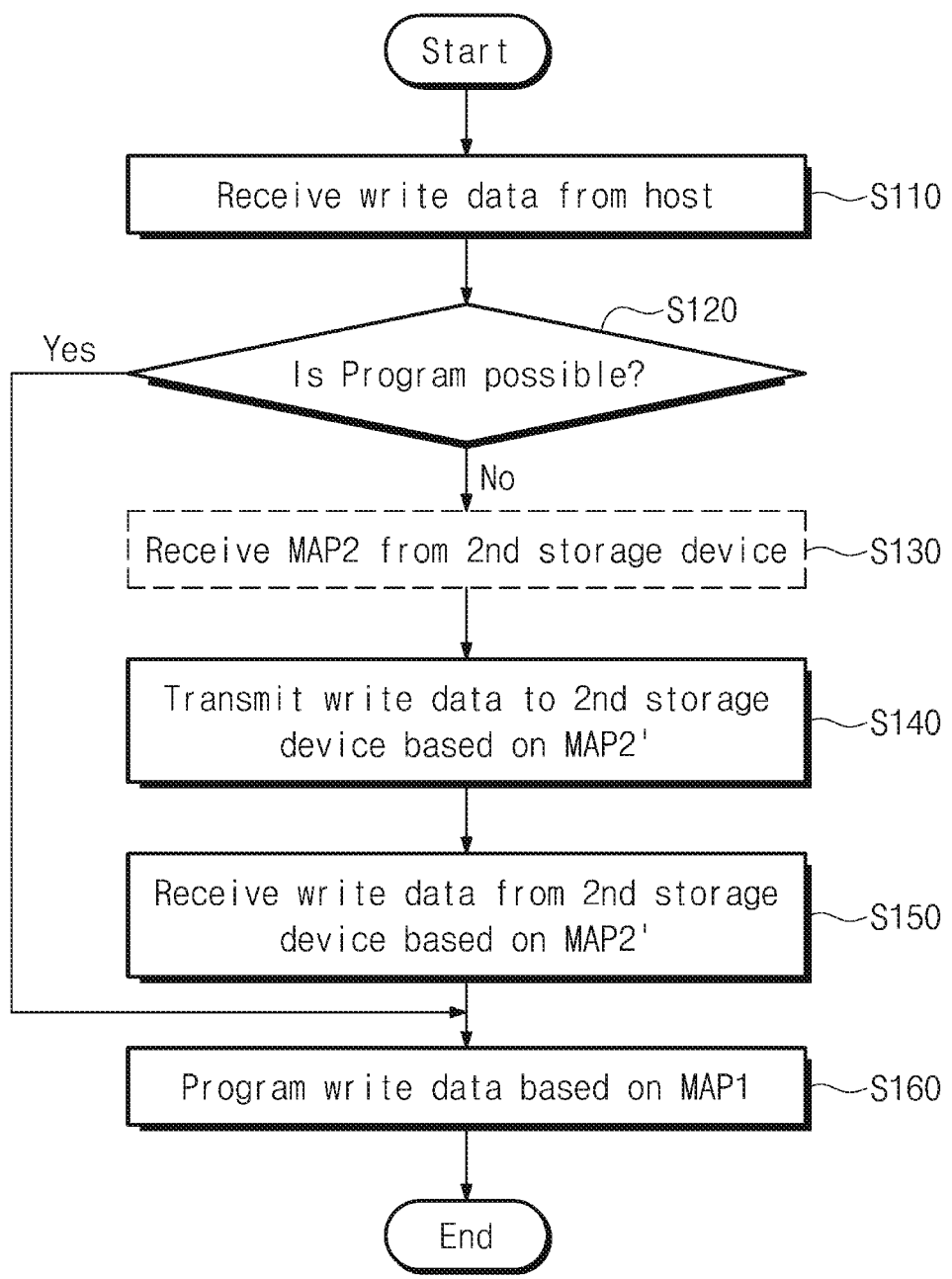
FIG. 4 is a flowchart illustrating an operation of a first storage device of FIG. 1.

FIG. 4 is a flowchart illustrating an operation of a first storage device of FIG. 1. Below, for ease of illustration and for ease of description, it is assumed that write data received from the host 1010 is write data to be stored in the first nonvolatile memory device 1120. That is, example embodiments of the inventive concepts will be described under the condition that the host 1010 stores write data in the first storage device 1100. However, example embodiments of the inventive concepts may not be limited thereto. For example, write data may be stored in the second storage device 1200 by an explicit request of the host 1010. Also, it may be well understood that the following operations are described with reference to the first storage device 1100 but may be performed by any other element (e.g., the first flash translation layer FTL1 or a physical layer or a logical layer included in the host interface 1114) of the first storage device 1100.

Referring to FIGS. 1 and 4, in operation S110, the first storage device 1100 may receive write data from the host 1010. For example, the first storage device 1100 may receive a write command indicating a write operation of the first storage device 1100 from the host 1010 and may receive write data to be stored in the first storage device 1100 in response to the received write command.

In operation S120, the first storage device 1100 may determine whether programming is possible. For example, if the first nonvolatile memory device 1120 is performing a program operation, it is impossible to store the write data in the first nonvolatile memory device 1120 until the program operation being performed is completed.

If to program is impossible, in operation S130, the first storage device 1100 may receive the second mapping information MAP2 from the second storage device 1200. For example, if to program is impossible, the first storage device 1100 may request the second mapping information MAP2 from the second storage device 1200 by using a vendor command, a reserved command, or a separate command combination. The second storage device 1200 may provide the second mapping information MAP2 to the first storage device 1100 in response to the received request.

In operation S140, the first storage device 1100 may transmit the write data to the second storage device 1200 based on the second mapping information MAP2'. For example, the first storage device 1100 may select a storage area, in which the write data is to be stored, of storage areas of the second nonvolatile memory device 1220 based on the second mapping information MAP2'. The first storage device 1100 may transmit a write command, which includes a physical address of the selected storage area, and the write data to the second storage device 1200.

In an example embodiment, a storage area, in which the write data is to be stored, of storage areas of the second nonvolatile memory device 1220 may be a physical area or a logical area that is predetermined. That is, some of the storage areas of the second nonvolatile memory device 1220 may be in advance allocated to be used by the first storage device 1100.

In an example embodiment, the second storage device 1200 may store the write data in a storage area corresponding to the physical address in response to the received write command.

In an example embodiment, the first storage device 1100 may update the second mapping information MAP2' based on a physical address of the selected storage area and a logical address of the write data.

In operation S150, the first storage device 1100 may receive the write data from the second storage device 1200 based on the second mapping information MAP2'. For example, the second mapping information MAP2' may include information about a physical address of a storage area, in which the write data are stored, of the storage areas of the second nonvolatile memory device 1220. The first storage device 1100 may read the write data from the second storage device 1200 based on the physical address information included in the second mapping information MAP2'.

In an example embodiment, for the above-described read operation, the first storage device 1100 may provide the second storage device 1200 with a read command, a flush command, or a specific command, in which the physical address of the second nonvolatile memory device 1220 is included. The second storage device 1200 may provide the first storage device 1100 with the write data stored in the second nonvolatile memory device 1220 in response to the received command. In an example embodiment, the write data provided to the first storage device 1100 may be invalidated on the second nonvolatile memory device 1220.

In an example embodiment, operation S150 may be performed when a specific condition is satisfied. The specific condition may include the case in which the first and second storage devices 1100 and 1200 are at an idle state or the case in which an available space is present in the data buffer of the first storage device 1100 or is not less than a reference size.

In operation S160, the first storage device 1100 may program the write data based on the first mapping information MAP1. For example, the first storage device 1100 may program the write data received from the second storage device 1200 in the first nonvolatile memory device 1120 based on the first mapping information MAP1. The first storage device 1100 may update the first mapping information MAP1 based on a logical address of the write data and a physical address of the first nonvolatile memory device 1120.

In an example embodiment, if the determination result of operation S120 indicates that to program is possible, the first storage device 1100 may perform operation S160. That is, if the determination result of operation S120 indicates that to program is possible, the first storage device 1100 may program the write data received from the host 1010 in the first nonvolatile memory device 1120.

In an example embodiment, operation S130 may be omitted. For example, the first storage device 1100 and the second storage device 1200 may exchange the first and second mapping information MAP1 and MAP2 with each other periodically or randomly. In this case, the first and second mapping information MAP1 and MAP2' may have been stored in the first storage device 1100. That is, if the first storage device 1100 and the second storage device 1200 exchange the first and second mapping information MAP1 and MAP2 with each other periodically or randomly, operation S130 may be omitted.

As described above, when the first nonvolatile memory device 1120 is programmable, the first storage device 2100 may program write data received from the host 1010 in the first nonvolatile memory device 1120; when the first nonvolatile memory device 1120 is not programmable, the first storage device 2100 may transmit the received write data to the second storage device 1200 based on the second mapping information MAP2' such that the received write data are stored in the second nonvolatile memory device 1220. Accordingly, it may be possible to secure a capacity of the data buffer. According to the above description, since the first storage device 1100 receives next write data from the host 1010, it may be possible to prevent the write operation from being delayed due to a lack of capacity of the data buffer.

Figure 5:
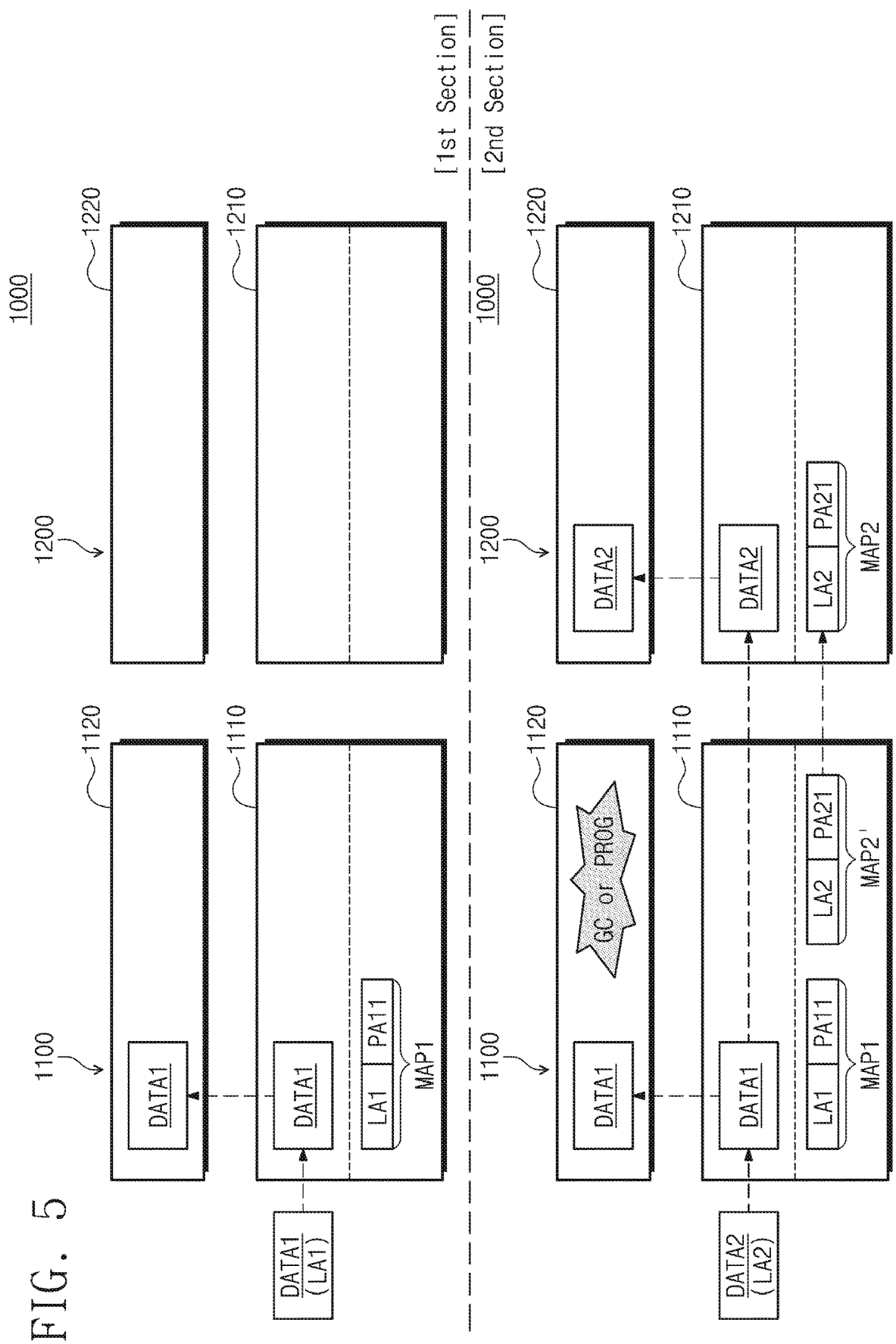
FIGS. 5 and 6 are drawings for describing an operation of FIG. 4.
Figure 6:
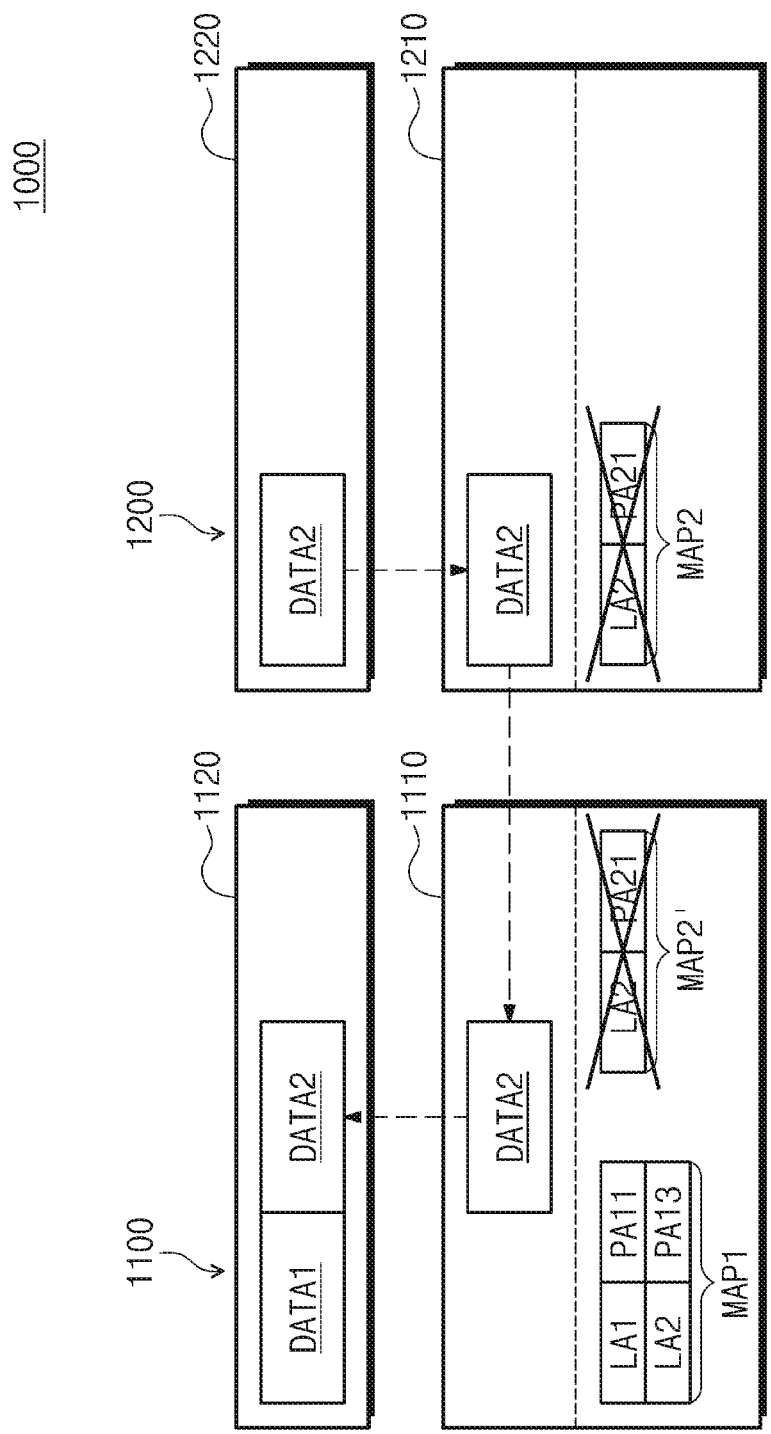

FIGS. 5 and 6 are drawings for describing an operation of FIG. 4. For a brief description, elements which are unnecessary to describe an operation of FIG. 4 are omitted. Also, it is assumed that first and second data DATA1 and DATA2 received from the host 1010 are write data to be stored in the first nonvolatile memory device 1120. Also, for ease of illustration, only mapping information associated with the first and second data DATA1 and DATA2 are illustrated in FIGS. 5 and 6.

In addition, as described above, it is assumed that the first storage device 1100 receives the first and second write data DATA1 and DATA2 from the host 1010 through the first ports PT01 and PT11 and transmits and receives the second write data DATA2 to and from the second storage device 1200 through the second ports PT12 and PT22.

Furthermore, as described above, it is assumed that the first storage device 1100 manages the second mapping information MAP2' from the second storage device 1200 and stores the second write data DATA2 in the second nonvolatile memory device 1220 based on the second mapping information MAP2'.

However, example embodiments of the inventive concepts may not be limited thereto. For example, the example embodiments of the inventive concepts may be variously changed or modified without departing from the scope and spirit of the inventive concepts.

Referring to FIGS. 1 and 4 to 6, the user device 1000 includes the first storage device 1100 and the second storage device 1200. The first storage device 1100 may include the first controller 1110 and the first nonvolatile memory device 1120. The second storage device 1200 may include the second controller 1210 and the second nonvolatile memory device 1220.

As illustrated in a first section of FIG. 5, the first controller 1110 may receive the first data DATA1 from the host 1010. The first data DATA1 may be data to be stored in the first nonvolatile memory device 1120 by a request of the host 1010. The first data DATA1 may correspond to a first logical address LA1. The received first data DATA1 may be temporarily stored in the data buffer (e.g., SRAM) of the first controller 1110.

For example, the first controller 1110 may program the first data DATA1 in the first nonvolatile memory device 1120 based on the first mapping information MAP1. For example, the first controller 1110 may manage information about a correspondence relationship between a first physical address PA11 and the first logical address LA1, which correspond to the first data DATA1, as the first mapping information MAP1. The first physical address PAH may be a physical address of the first nonvolatile memory device 1120, at which the first data DATA1 are stored.

In an example embodiment, the operation illustrated in the first section of FIG. 5 may correspond to operation S110, operation S120, and operation S160 of FIG. 4.

Next, as illustrated in a second section of FIG. 5, the first controller 1110 may receive the second data DATA2 from the host 1010. The second data DATA2 may be data to be stored in the first nonvolatile memory device 1120 by a request of the host 1010. The second data DATA2 may correspond to a second logical address LA2. The received second data DATA2 may be temporarily stored in the data buffer (e.g., SRAM) of the first controller 1110.

In an example embodiment, an event in which the first nonvolatile memory device 1120 is performing a garbage collection operation, a program operation, a read operation, or an erase operation may occur, while the first controller 1110 temporarily stores the second data DATA2 in the data buffer. That is, an event in which the first nonvolatile memory device 1120 is not at a programmable state may occur. In this case, as described above, the second data DATA2 has to be retained in the data buffer until an operation of the first nonvolatile memory device 1120 is completed. This situation may cause a write delay.

In this case, the first controller 1110 may transmit the second data DATA2 to the second storage device 1200 based on the second mapping information MAP2'. For example, the first controller 1110 may manage the second mapping information MAP2' received from the second storage device 1200. The first controller 1110 may transmit the second data DATA2 to the second controller 1210 of the second storage device 1200 such that the second data DATA2 are stored in the second nonvolatile memory device 1220. In this case, the first controller 1110 may manage correspondence information between the second logical address LA2 and a second physical address PA21 as the second mapping information MAP2'. The second physical address PA21 may be a physical address of the second nonvolatile memory device 1220, at which the second data DATA2 is to be stored. That is, the first controller 1110 may store the second data DATA2 in the second nonvolatile memory device 1220 based on the second mapping information MAP2'.

In an example embodiment, the first controller 1110 may transmit a write command for storing the second data DATA2 in the second nonvolatile memory device 1220 to the second controller 1210. The write command may include information of the second physical address PA21.

The second controller 1210 may store the second data DATA2 in a storage area, which corresponds to the second physical address PA21, of storage areas of the second nonvolatile memory devices 1220 in response to the received command. In an example embodiment, the second mapping information MAP2' updated by the first controller 1110 may be provided to the second controller 1210, and the second controller 1210 may manage the updated second mapping information MAP2' as the second mapping information MAP2.

In an example embodiment, the operation illustrated in the second section of FIG. 5 may correspond to operation S110, operation S120, and operation S140 of FIG. 4. In an example embodiment, since the second data DATA2 transmitted to the second storage device 1200 is released from the data buffer, an available capacity of the data buffer may be secured.

And then, as illustrated in FIG. 6, the first storage device 1100 may read the second data DATA2 from the second storage device 1200 and may store the read second data DATA2 in the first nonvolatile memory device 1120. The second data DATA2 indicates data that should be stored in the first nonvolatile memory device 1120 by a request of the host 1010 but are stored in the second nonvolatile memory device 1220 under control of the first controller 1110.

For example, the first storage device 1100 may read the second data DATA2 from the second storage device 1200 under a specific condition. The specific condition may include the following conditions: an idle state, the condition in which a capacity of the data buffer of the first controller 1110 is not less than a reference size, and the condition in which the size of the second data DATA2 is not less than a reference size.

The first controller 1110 may recognize that the second data DATA2 has been stored in the second nonvolatile memory device 1220, based on the second mapping information MPA2'. On the basis of the second mapping information MAP2', the first controller 1110 may read the second data DATA2 from the second nonvolatile memory device 1220 and may store the second data DATA2 in the first nonvolatile memory device 1120. The first controller 1110 may manage correspondence information between the second logical address LA2 and a third physical address PA13 of the second data DATA2 as the first mapping information MAP1. The third physical address PA13 may be a physical address of the first nonvolatile memory device 1120, at which the second data DATA2 are stored.

The first controller 1110 may invalidate correspondence information between the second logical address LA2 and the second physical address PA21, which are included in the second mapping information MAP2'. The second mapping information MAP2', in which correspondence information between the second logical address LA2 and the second physical address PA21 is invalidated, may be provided to the second controller 1210. The second controller 1210 may manage the second mapping information MAP2 based on the received information.

As described above, when a write delay occurs, the first storage device 1100 may temporarily store write data received from the host 1010 in the second storage device 1200 based on the second mapping information MAP2' of the second storage device 1200. Afterwards, when a specific condition is satisfied, the write data temporarily stored in the second storage device 1200 may be stored in the first nonvolatile memory device 1120 of the first storage device 1100 under control of the first storage device 1100. Accordingly, since a write delay is prevented even at a situation in which write operations of the first storage device 1100 such as a program operation and a garbage collection operation can be delayed, a storage device having improved performance is provided.

Figure 7:
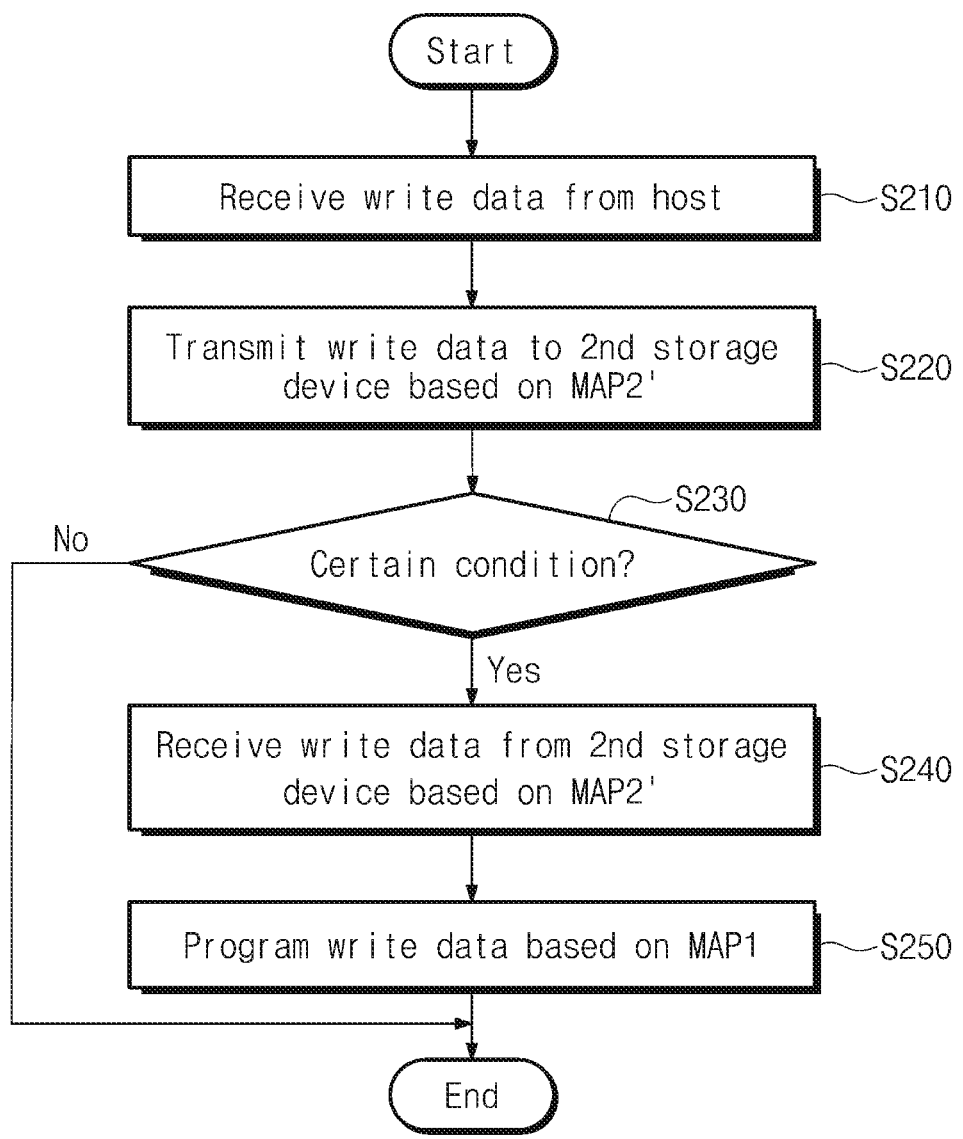
FIG. 7 is a flowchart illustrating another operation of a first storage device of FIG. 1.

FIG. 7 is a flowchart illustrating another operation of a first storage device of FIG. 1. For the sake of brevity, a description of elements that are the same as those above described is omitted. Referring to FIGS. 1 and 7, in operation S210, the first storage device 1100 may receive write data from the host 1010. The operation S210 is similar to the operation S110 of FIG. 4, and a detailed description thereof is thus omitted.

In operation S220, the first storage device 1100 may transmit the received write data to the second storage device 1200 based on the second mapping information MAP2'. In an example embodiment, since operation S220 is similar to operation S140 of FIG. 4, a detailed description thereof is thus omitted.

In an example embodiment, unlike operation S140 of FIG. 4, operation S220 may be performed regardless of whether the first storage device 1100 is programmable. That is, even though the first nonvolatile memory device 1120 is programmable, the first storage device 1100 may transmit the write data to the second storage device 1200. The second storage device 1200 may store the write data in the second nonvolatile memory device 1220.

In operation S230, the first storage device 1100 may determine whether a specific condition is satisfied. For example, the first storage device 1100 may determine the size of data, which will be moved to the first nonvolatile memory device 1120, of data stored in the second nonvolatile memory device 1220, based on the second mapping information MAP2'. That the determined size of data is not less than a reference size indicates that the specific condition is satisfied. In this case, the first storage device 1100 may perform operation S240. If the specific condition is not satisfied, the first storage device 1100 may not perform a separate operation.

In operation S240, the first storage device 1100 may receive the write data from the second storage device 1200 based on the second mapping information MAP2'. In operation S250, the first storage device 1100 may program the received write data in the first nonvolatile memory device 1120 based on the first mapping information MAP1. Operation S240 and operation S250 are similar to operation S150 and operation S160 of FIG. 4, and a detailed description thereof is thus omitted.

In an example embodiment, the first nonvolatile memory device 1120 may be a NAND flash memory. The NAND flash memory may read or program data in units of a page or a word line and may erase data in units of a memory block, a sub-block, or a super block. In an example embodiment, the size of write data received from the host 1010 may be smaller than an erase unit of the first nonvolatile memory device 1120.

Due to a physical characteristic of the NAND flash memory, the first controller 1110 may perform a maintenance operation such as garbage collection or wear leveling to use the first nonvolatile memory device 1120 efficiently. The maintenance operation may have an influence on the lifespan of the first nonvolatile memory device 1120 because it is an operation of repeatedly performing a program, read, or erase operation on the first nonvolatile memory device 1120. In an example embodiment, in the case where segmentation of write data received from the host 1010 is reduced, the number of times of maintenance operations may decrease, thereby preventing the lifespan of the first nonvolatile memory device 1120 from being shortened.

In an example embodiment, according to the operating method of FIG. 7, it may be possible to reduce a decrease in lifespan due to the maintenance operation of a storage device such as the above-described garbage collection. For example, as described above, the first storage device 1100 is configured to first store write data received from the host 1010 in the second storage device 1200. When the size of write data stored in the second storage device 1200 is a predetermined size or larger, the first storage device 1100 may store the write data, which have been stored in the second storage device 1200, in the first nonvolatile memory device 1120. In an example embodiment, the reference size may correspond to the size of a memory block included in the first nonvolatile memory device 1120.

That is, when write data to be stored in the first storage device 1100 is first stored in the second storage device 1200 and the size of write data stored in the second storage device 1200 reaches the size of a memory block, the write data stored in the second storage device 1200 may be stored or moved in or to the first storage device 1100. In this case, segmentation of write data may be prevented, and thus the lifespan of the first storage device 1100 may be prevented from being shortened due to the garbage collection or any other maintenance operation.

According to the above-described example embodiments of the inventive concepts, the first and second storage devices 1100 and 1200 may exchange the first and second mapping information MAP1 and MAP2 with each other. The first storage device 1100 may determine whether to program is possible; if to program is impossible, the first storage device 1100 may store write data to be stored in the first storage device 1100 in the second storage device 1200. In this case, since a write delay due to factors such as a data buffer size of the first storage device 1100, garbage collection, and a program speed of the first nonvolatile memory device 1120 is reduced, a storage device of improved performance is provided.

In addition, the first storage device 1100 may first store write data to be stored in the first storage device 1100 in the second storage device 1200, based on the second mapping information MAP2'. Afterwards, when the size of write data stored or accumulated in the second storage device 1200 is a specific size or larger, the first storage device 1100 may store the write data, which have been stored or accumulated in the second storage device 1200, in the first nonvolatile memory device 1120. In this case, since segmentation of write data stored in the first storage device 1100 is reduced, the number of times of maintenance operations may decrease. This may mean that the lifespan of the first storage device 1100 is improved.

Figure 8:
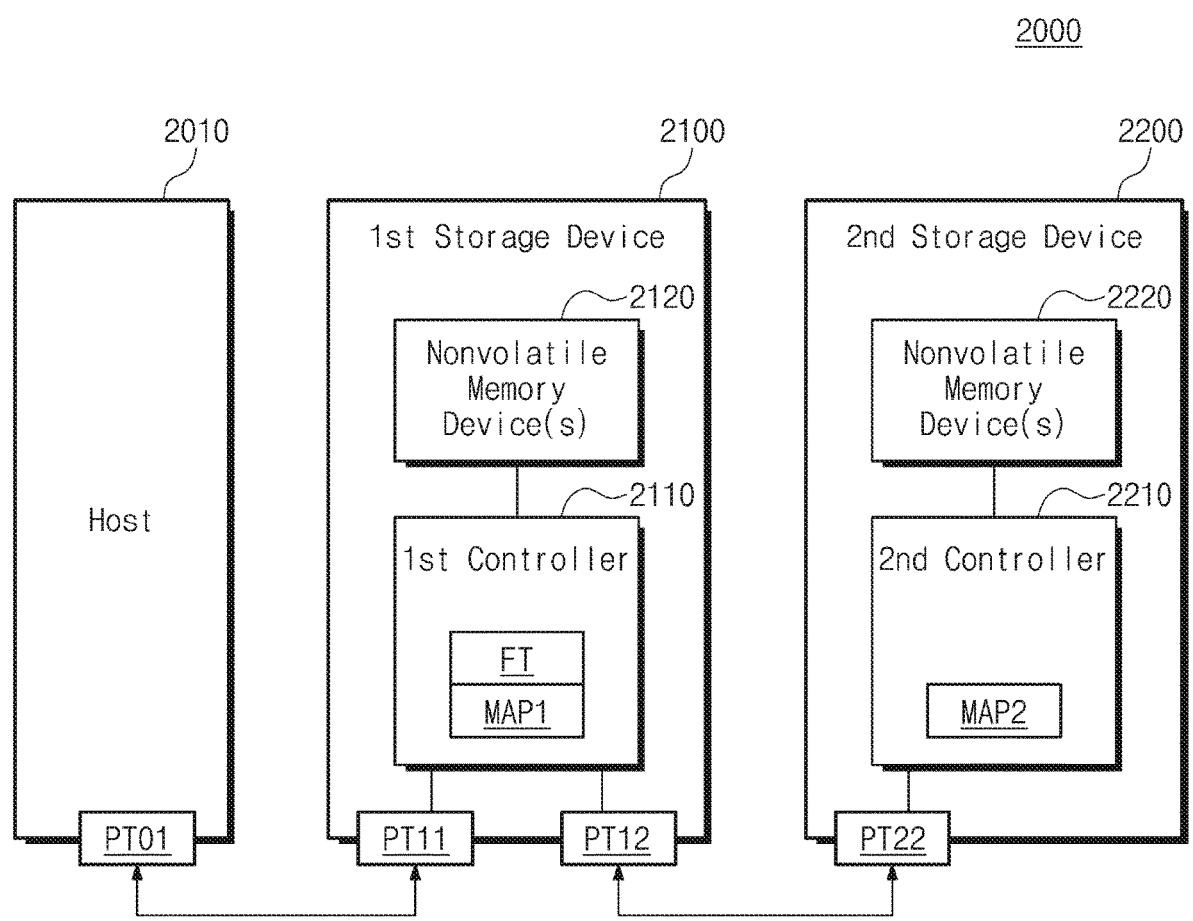
FIG. 8 is a block diagram illustrating a user device, according to an example embodiment of the inventive concepts.

FIG. 8 is a block diagram illustrating a user device, according to an example embodiment of the inventive concepts. Referring to FIG. 8, a user device 2000 may include a host 2010, a first storage device 2100, and a second storage device 2200. The first storage device 2100 may include a first controller 2110 and a first nonvolatile memory device 2120. The second storage device 2200 may include a second controller 2210 and a second nonvolatile memory device 2220.

Since the host 2010, the first and second storage devices 2100 and 2200, the first and second controllers 2110 and 2210, and the first and second nonvolatile memory devices 2120 and 2220 are described with reference to FIG. 1, a detailed description thereof is thus omitted.

Unlike the first and second controllers 1110 and 1210 of FIG. 1, the first and second controllers 2110 and 2210 of FIG. 8 may not exchange the first and second mapping information MAP1 and MAP2 with each other. Instead, the first controller 2110 may manage a logical address of write data stored in the second storage device 2200 by using a flush table FT.

For example, the first and second storage devices 1100 and 1200 described with reference to FIGS. 1 to 7 may exchange the first and second mapping information MAP1 and MAP2 with each other, and the first storage device 1100 may store write data in the second nonvolatile memory device 1220 based on the second mapping information MAP2'. Unlike the above description, the first and second storage devices 2100 and 2200 of FIG. 8 may not exchange the first and second mapping information MAP1 and MAP2 with each other, and the first storage device 2100 may manage a logical address of write data stored in the second nonvolatile memory device 2220 based on the flush table FT. In this case, as described above, write data may be data to be stored in the first nonvolatile memory device 2120 by a request of the host 2010.

During an idle time or when the size of write data stored in the second storage device 2200 is a reference size or larger, the first storage device 1100 may store the write data, which have been stored in the second storage device 2200, in the first nonvolatile memory device 2120 based on the flush table FT.

In an example embodiment, write data exchange between the first and second storage devices 1100 and 1200 described with reference to FIGS. 1 to 7 may be performed with reference to a physical address of the second nonvolatile memory device 1220, but write data exchange between the first and second storage devices 2100 and 2200 of FIG. 8 may be performed with reference to a logical address of write data In an example embodiment, the first storage device 2100 of FIG. 8 may transmit write data to the second storage device 2200 when to program is impossible, as described with reference to FIGS. 4 to 6. Alternatively, as described with reference to FIG. 7, the first storage device 2100 of FIG. 8 may first store write data in the second storage device 2200 regardless of whether to program is possible and may store the write data stored in the second storage device 2200 in the first nonvolatile memory device 2120 under a specific condition.

As described above, the first storage device 2100 may manage a logical address of write data stored in the second nonvolatile memory device 2220 (in more detail, data to be stored in the first nonvolatile memory device 2120) by using the flush table FT; on the basis of the flush table FT, the first storage device 2100 may store the write data in the second storage device 2200 or may move the write data stored in the second storage device 2200 to the first nonvolatile memory device 2120.

Figure 9:
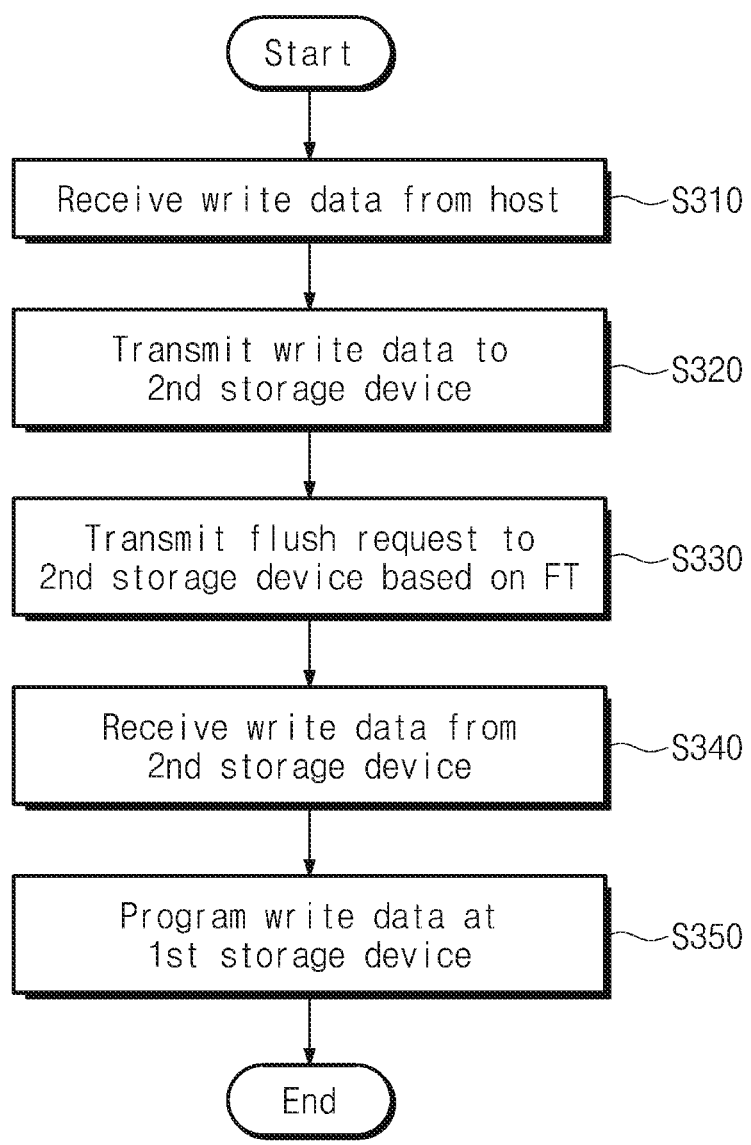
FIG. 9 is a flowchart illustrating an operation of a first storage device of FIG. 8.

FIG. 9 is a flowchart illustrating an operation of a first storage device of FIG. 8. Referring to FIGS. 8 and 9, in operation S310, the first storage device 2100 may receive write data from the host 2010.

In operation S320, the first storage device 2100 may transmit the received write data to the second storage device 2200. In an example embodiment, the first storage device 2100 may transmit a write command, which includes a logical address corresponding to the received write data, to the second storage device 2200. The first storage device 2100 may manage a logical address included in the write command transmitted to the second storage device 2200 by using the flush table FT.

In an example embodiment, the second storage device 2200 may store the received write data in the second nonvolatile memory device 2220 in response to the received write command and may manage correspondence information between the logical address included in the write command and a physical address of the second nonvolatile memory device 2220 as the second mapping information MAP2.

In operation S330, the first storage device 2100 may transmit a flush request to the second storage device 2200 based on the flush table FT. For example, the flush table FT may include information about a logical address of data, which are stored in the second storage device 2200, of data to be stored in the first storage device 2100. The first storage device 2100 may transmit the flush request and the logical address to the second storage device 2200 to store write data corresponding to the logical address included in the flush table FT in the first nonvolatile memory device 2120. In an example embodiment, the flush request may be a command predefined by a communication protocol between the first and second storage devices 2100 and 2200, a vendor command, a reserved command, a read command, or any combination thereof.

In operation S340, the first storage device 2100 may receive the write data from the second storage device 2200. For example, the second storage device 2200 may transmit write data corresponding to the received logical address to the first storage device 2100 in response to the flush request from the first storage device 2100. In an example embodiment, the write data transmitted to the first storage device 2100 may be invalidated in the second nonvolatile memory device 2220. In other words, the second controller 2210 of the second storage device 2200 may delete or invalidate information, which corresponds to a logical address of write data transmitted to the first storage device 2100, from the second mapping information MAP2.

In operation S350, the first storage device 2100 may program the received write data in the first nonvolatile memory device 2120. The first storage device 2100 may manage information about a correspondence relationship between the logical address of the write data and a physical address of the first nonvolatile memory device 2120, as the first mapping information MAP1. In an example embodiment, information about the logical address of the write data programmed in the first nonvolatile memory device 2120 may be deleted or invalidated from the flush table FT.

In an example embodiment, operation S320 may be performed according to whether the first storage device 2100 is programmable. For example, as described with reference to operation S120 of FIG. 4, operation S320 may be performed when to program is impossible in the first storage device 2100 due to an operation of the first nonvolatile memory device 2120 or any other maintenance operation (e.g., garbage collection).

In an example embodiment, operation S330 may be performed when a specific condition is satisfied. For example, the first storage device 2100 may perform operation S330 when the size of write data stored in the second storage device 2200 (in more detail, data, which are stored in the second storage device 2200, of data to be stored in the first storage device 2100) is a reference size or larger or when the first and second storage devices 2100 and 2200 are an idle state.

Figure 10:
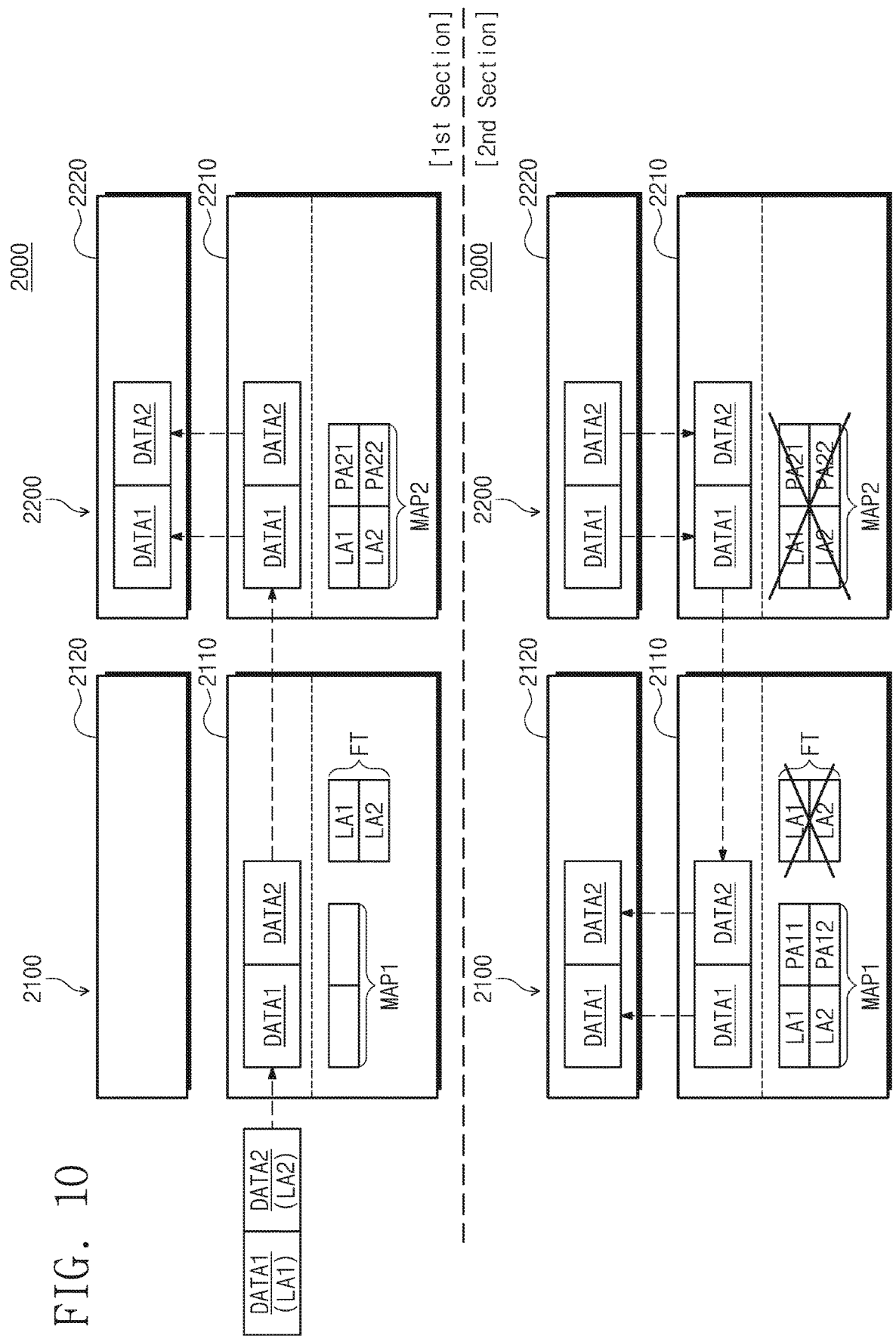
FIG. 10 is a drawing for describing an operation of FIG. 9.

FIG. 10 is a drawing for describing an operation of FIG. 9. For the sake of brevity and for ease of description, elements that are unnecessary to describe an operation of FIG. 9 are omitted. Also, it is assumed that first and second data DATA1 and DATA2 received from the host 2010 respectively correspond to first and second logical addresses LA1 and LA2 and are data to be stored in the first storage device 2100. However, example embodiments of the inventive concepts may not be limited thereto.

Referring to FIGS. 8 to 10, the user device 2000 may include the first and second storage devices 2100 and 2200. The first storage device 2100 may include the first controller 2110 and the first nonvolatile memory device 2120, and the second storage device 2200 may include the second controller 2210 and the second nonvolatile memory device 2220.

As illustrated in a first section of FIG. 10, the first controller 2110 may receive the first and second data DATA1 and DATA2 from the host 2010. The first controller 2110 may provide the received first and second data DATA1 and DATA2 to the second controller 2210. The first controller 2110 may manage the first and second logical addresses LA1 and LA2 of the transmitted first and second data DATA1 and DATA2 by using the flush table FT.

The second controller 2210 may store the received first and second data DATA1 and DATA2 in the second nonvolatile memory device 2220. The second controller 2210 may manage correspondence information between the first and second logical addresses LA1 and LA2 and first and second physical addresses PA21 and PA22 as the second mapping information MAP2. The first and second physical addresses PA21 and PA22 may be physical addresses of the second nonvolatile memory device 2220, at which the first and second data DATA1 and DATA2 are stored.

The first controller 2110 may recognize that the first and second data DATA1 and DATA2 respectively corresponding to the first and second logical addresses LA1 and LA2 are stored in the second storage device 2200, based on the flush table FT. In this case, as illustrated in a second section of FIG. 10, the first controller 2110 may receive the first and second data DATA1 and DATA2 from the second controller 2210 and may store the received first and second data DATA1 and DATA2 in the first nonvolatile memory device 2120.

For example, the first controller 2110 may provide a flush request including the first and second logical addresses LA1 and LA2 to the second controller 2210, based on the flush table FT. In response to the received flush request, the second controller 2210 may read the first and second data DATA1 and DATA2, which correspond to the first and second logical addresses LA1 and LA2, from the second nonvolatile memory device 2220 based on the second mapping information MAP2 and may transmit the read first and second data DATA1 and DATA2 to the first controller 2110. The first controller 2110 may store the received first and second data DATA1 and DATA2 in the first nonvolatile memory device 2120.

In an example embodiment, the second controller 2210 may transmit the first and second data DATA1 and DATA to the first controller 2110 in response to the flush request and may then delete or invalidate correspondence information of the first and second logical addresses LA1 and LA2 and the first and second physical addresses PA21 and PA22 from the second mapping information MAP2.

In an example embodiment, after storing the first and second data DATA1 and DATA2 in the first nonvolatile memory device 2120, the first controller 2110 may delete or invalidate information of the first and second logical addresses LA1 and LA2 from the flush table FT and may manage correspondence information between the first and second logical addresses LA1 and LA2 and third and fourth physical addresses PA11 and PA12 as the first mapping information MAP1. The third and fourth physical addresses PA11 and PA12 may be physical addresses of the first nonvolatile memory device 2120, at which the first and second data DATA1 and DATA2 are stored.

As described above, a first storage device according to an example embodiment of the inventive concepts may store write data received from a host in a second storage device based on second mapping information and may then store the write data stored in the second storage device in a first nonvolatile memory device.

In this case, the first and second storage devices may exchange first and second mapping information with each other, and the first storage device may perform the above-described data transfer operation based on the second mapping information. Alternatively, the first storage device may perform the above-described data transfer operation by separately managing a logical address of write data transmitted to the second storage device, such as a flush table.

In addition, if a write delay is occurred due to physical characteristics (a program speed, garbage collection, etc.) of the first nonvolatile memory device, the first storage device may secure an available space of a data buffer by transmitting the write data to the second storage device, thereby making it possible to continue to receive next write data. That is, since the write delay is reduced, the performance of a storage device may be improved.

Furthermore, the first storage device may first store the received write data in the second storage device; when the size of the write data stored in the second storage device is a reference size or larger, the first storage device may store the write data in the first nonvolatile memory. Accordingly, it may be possible to reduce a maintenance operation due to a physical characteristic (a physical characteristic such as a difference between a read/write unit and an erase unit). This may mean that the lifespan of the storage device is improved.

In an example embodiment, the example embodiments of the inventive concepts are described with reference to a write operation of the first storage device. However, example embodiments of the inventive concepts may not be limited thereto. For example, the second storage device may also perform an operation that is based on the above-described example embodiments.

Figure 11:
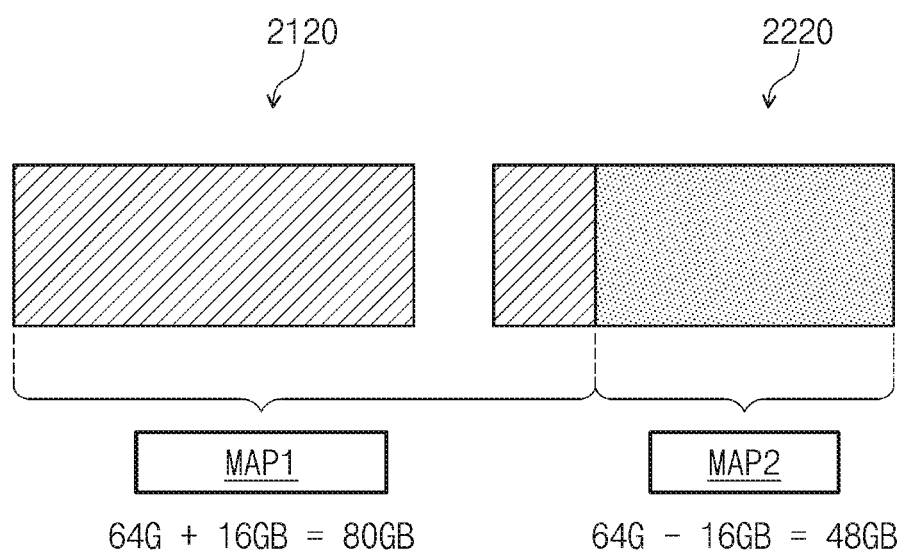
FIG. 11 is a block diagram for describing another example embodiment of a user device of FIG. 8.

FIG. 11 is a block diagram for describing another example embodiment of a user device of FIG. 8. For a brief description, elements which are unnecessary to describe an operation of the user device 2000 are omitted.

In an example embodiment, the first storage device 1100/2100 described with reference to FIGS. 1 to 10 may be configured to store write data to be stored in the first storage device 1100/2100 in the second storage device 1200/2200 by using the second mapping information MAP2 of the second storage device 1200/2200 or the flush table FT.

Unlike the above description, referring to FIGS. 8 and 11, in an example embodiment of FIG. 11, a portion of a storage area of the second storage device 2200 may be pre-allocated as a storage area for the first storage device 2100. The pre-allocated storage area may be managed by the first mapping information MAP1 of the first storage device 2100. As a more detailed example, it is assumed that each of the first and second nonvolatile memory devices 2120 and 2220 has a storage capacity of 64 gigabytes (GB). In this case, in the example embodiment described with reference to FIGS. 1 to 10, storage spaces of the first and second storage devices may be respectively recognized by a host as being 64 GB. Unlike the example embodiment described with reference to FIGS. 1 to 10, in the example embodiment of FIG. 11, a portion (e.g., 16 GB) of the storage area of the second nonvolatile memory device 2220 may be allocated to the first storage device 2100, and the first storage device 2100 may manage the allocated area (e.g., 16 GB) of the second nonvolatile memory device 2220 and the storage area (e.g., 64 GB) of the first nonvolatile memory device 2120 by using the first mapping information MAP1. Consequently, the storage space of the first storage device 2100 may be recognized by the host 2010 as being 80 GB, and the storage space of the second storage device 2200 may be recognized by the host 2010 as being 48 GB.

In an example embodiment, the area allocated from the second storage device 2200 may be used for the operation described with reference to FIGS. 1 to 10. For example, the first storage device 2100 may store write data to be stored in the first nonvolatile memory device 2120 in the allocated area of the storage area of the second nonvolatile memory device 2220 and may manage write operation for write data or information about an area, in which the write data is stored, through the first mapping information MAP1.

In an example embodiment, the area allocating operation described with reference to FIG. 11 may be performed upon booting of the user device 200. For example, when the user device 2000 is booted, the above-described area allocating operation may be performed by firmware of the first and second storage devices 2100 and 2200. Alternatively, the above-described area allocating operation may be performed by an explicit request of the host 2010 upon booting of the user device 2000. In an example embodiment, an area of the second storage device 2200 allocated to the first storage device 2100 may be an area that is not recognized by the host 2010. For example, as described above, each of the first and second nonvolatile memory devices 2120 and 2220 may have a storage capacity of 64 GB, and 16 GB of the storage capacity of the second nonvolatile memory device 2220 may be allocated to the first storage device 2100. In this case, the first storage device 2100 may manage the first nonvolatile memory device 2120 and the allocated storage area based on the first mapping information MAP1, but a storage space of the first storage device 2100 recognized by the host 2010 may be 64 GB (i.e., the storage capacity of the first nonvolatile memory device 2120), and a storage space of the second storage device 2200 recognized by the host 2010 may be 48 GB. In this case, the allocated area (i.e., 16 GB) may not be recognized by the host 2010 but may be used as a dedicated space for temporarily storing write data as described above.

Figure 12:
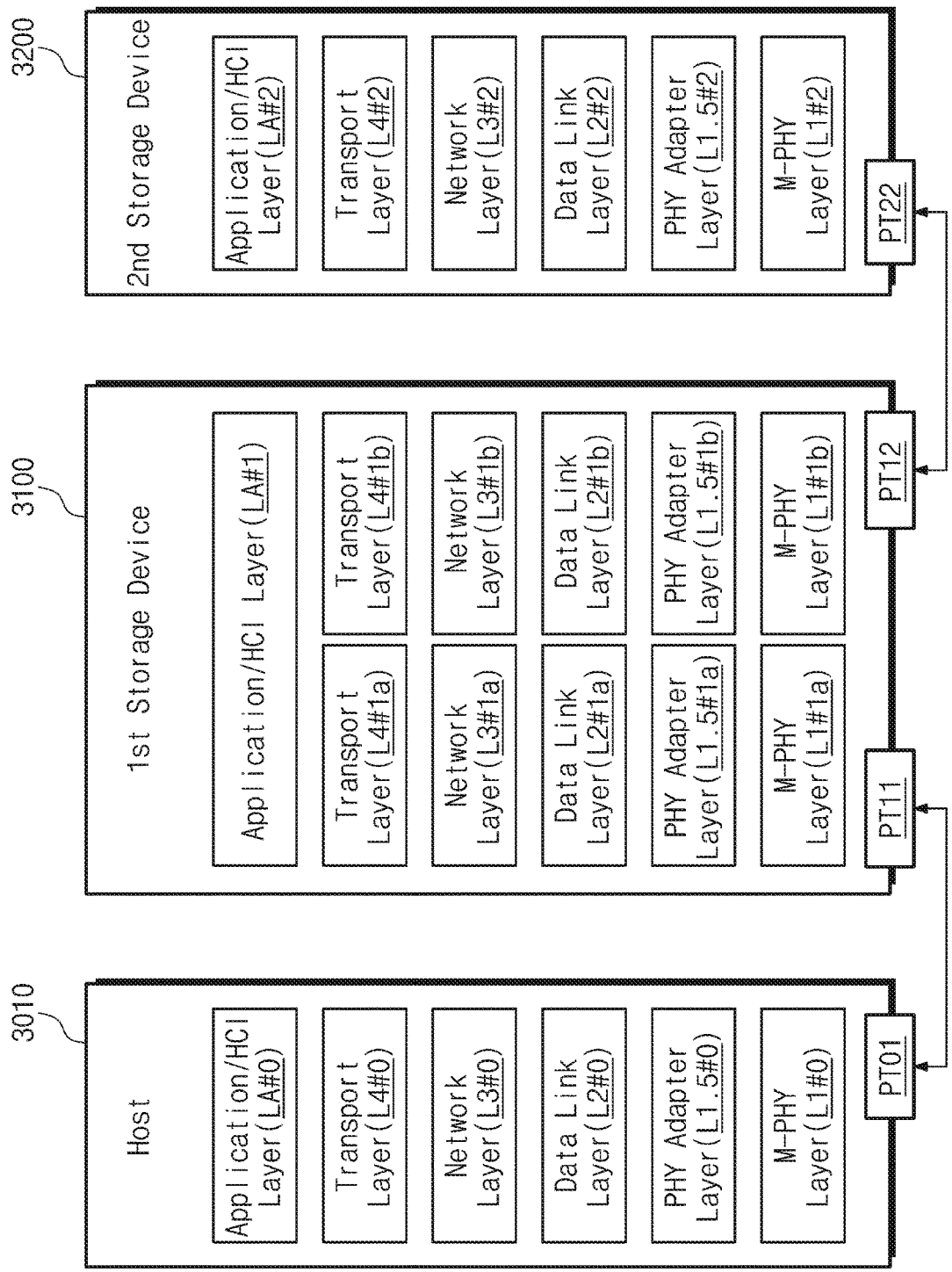
FIG. 12 is a block diagram illustrating an interface protocol applicable to a user device, according to an example embodiment of the inventive concepts.

FIG. 12 is a block diagram illustrating an interface protocol applicable to a user device, according to an example embodiment of the inventive concepts. Referring to FIG. 12, a user device 3000 may include a host 3010 and first and second storage devices 3100 and 3200. In an example embodiment, elements illustrated in FIG. 11 are to describe physical layers or logical layers complying with a communication interface between the host 3010 and the first and second storage devices 3100 and 3200, and elements that are unnecessary to describe the physical layers or logical layers are omitted. In an example embodiment, the user device 3000 illustrated in FIG. 11 may communicate in compliance with a universal flash storage (UFS) interface protocol.

For example, the host 3010 may include an M-PHY layer L1#0, a PHY adapter layer L1.5#0, a data link layer L2#0, a network layer L3#0, a transport layer L4#0, and an application/HC1 (Host Controller Interface) layer LA#0 (hereinafter referred to as an "application layer"). Each layer of the host 3010 may include a physical hardware circuit and/or a program code executable by a processor core to perform one's own function(s).

The first storage device 3100 may include M-PHY layers L1#1a and L1#1b, PHY adapter layers L1.5#1a and L1.5#1b, data line layers L2#1a and L2#1b, network layers L3#1a and L3#1b, transport layers L4#1a and L4#b, and an application/UTP (UFS Transport Protocol) layer LA#1 (hereinafter referred to as an "application layer").

All or some of the layers of the first storage device 3100 may be included in the first controller 1110 or 2110 of FIG. 1 or 8 or the host interface 1114 of FIG. 3.

The second storage device 3200 may include an M-PHY layer L1#2, a PHY adapter layer L1.5#2, a data link layer L2#2, a network layer L3#2, a transport layer L4#2, and an application/UTP layer LA#2. The layers of the second storage device 3200 may be included in the second controller 1210 or 2210.

Each of the layers of the first and second storage devices 3100 and 3200 may include a physical hardware circuit and/or a program code executable by a processor core to perform one's own function(s).

Each of the M-PHY layers L1#0 to L1#2 may include a communication circuit to send and receive a packet. The M-PHY layer L1#0 of the host 3010 may exchange a packet with the M-PHY layer L1#1a of the first storage device 3100 through the first ports PT01 and PT11, and the M-PHY layer L1#1b of the first storage device 3100 may exchange a packet with the M-PHY layer L1#2 of the second storage device 3200 through the second ports PT12 and PT22. For example, each of the M-PHY layers L1#0, L1#1a, L1#1b, and L1#2 may be a physical layer and may be implemented according to the M-PHY protocol proposed by the MIPI alliance.

The PHY adapter layers L1.5#0 to L1.5#2 may manage communication environments of the M-PHY layers L1#0 to L1#2, respectively. For example, the PHY adapter layers L1.5#0 to L1.5#2 may process data symbols or may control electric power, for the respective M-PHY layers L1#0 to L1#2. Each of the data link layers L2#0 to L2#2 may manage physical transmission and composition of data. Each of the network layers L3#0 to L3#2 may manage a communication path or may handle communication timing. Each of the transport layers L4#0 to L4#2 may detect an error of data and may recover erroneous data.

Accordingly, the PHY adapter layers L1.5#0 to L1.5#2, the data link layers L2#0 to L2#2, the network layers L3#0 to L3#2, and the transport layers L4#0 to and L4#2 may perform packet transmission and conversion through the M-PHY layers L1#0 to L1#2. For example, the PHY adapter layers L1.5#0 to L1.5#2, the data link layers L2#0 to L2#2, the network layers L3#0 to L3#2, and the transport layers L4#0 to L4#2 may be implemented according to the UniPro protocol supported by the MIPI alliance as a link layer.

The application layers LA#0 to LA#2, which are upper layers, may handle a request from the user of the host 3010 and the first and second storage devices 3100 and 3200. In an example embodiment, the M-PHY layers L1#0 to L1#2, the PHY adapter layers L1.5#0 to L1.5#2, the data link layers L2#0 to L2#2, the network layers L3#0 to L3#2, and the transport layers L4#0 to L4#2, which are lower layers, may communicate with an external device for the application layers LA#0 to LA#2.

Communications between respective layers may be based on packets having different data formats. For example, a data format of a packet exchanged between the application layers LA#0 and LA#1 may be different from a data format of a packet exchanged between the PHY adapter layers L1.5#0 and L1.5#1a. For example, a data format of a packet exchanged between the data link layers L2#1b and L2#2 may be different from a data format of a packet exchanged between the transport layers L4#1b and L4#2.

In an example embodiment, each of the application layers LA#0, LA#1, and LA#2 may convey and process a packet having a UFS protocol information unit (UPIU) format.

Figure 13:
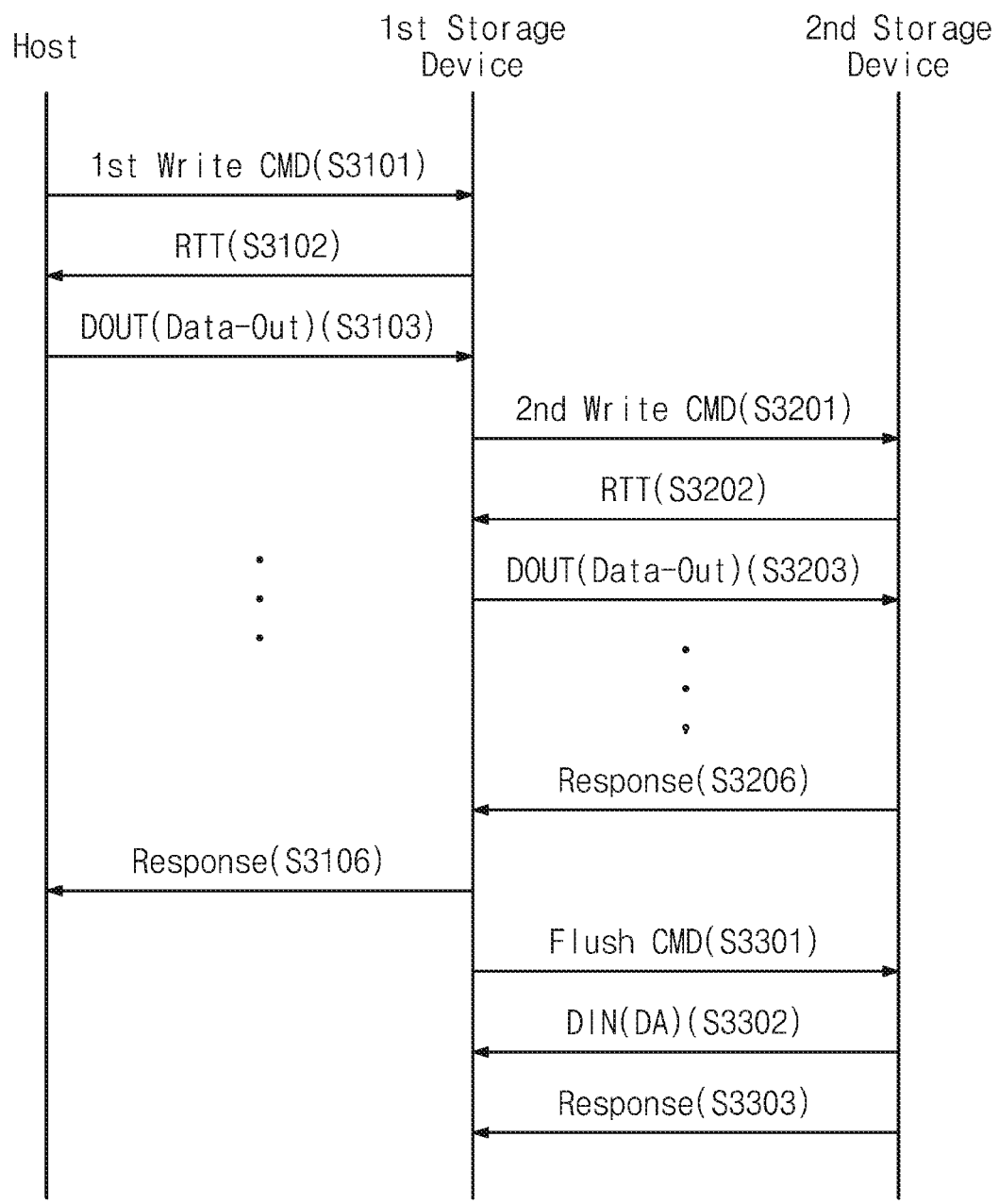
FIG. 13 is a flowchart illustrating an operation of a user device of FIG. 12.

FIG. 13 is a flowchart illustrating an operation of a user device of FIG. 12. In an example embodiment, the user device 3000 of FIG. 12 operates according to the UFS interface protocol, and an operation that is based on the flowchart of FIG. 13 illustrates an operating method that complies with the UFS interface protocol. Below, it is assumed that information exchanged between the host 3010 and the first storage device 3100 and information exchanged between the first and second storage devices 3100 and 3200 are exchanged in the form of packet. The packet form may correspond to a packet having the UPIU format as described above.

Referring to FIGS. 12 and 13, in operation S3101, the host 3010 may transmit a first write command to the first storage device 3100. In an example embodiment, the first write command may indicate a write request associated with the first storage device 3100.

In operation S3102, the first storage device 3100 may transmit a ready to transfer (RTT) packet to the host 3010 in response to the first write command.

In operation S3103, the host 3010 may transmit a data-output (DOUT) packet to the first storage device 3100 in response to the RTT packet. The DOUT packet may include at least a portion of write data to be stored in the first storage device 3100.

In an example embodiment, write data may be transmitted from the host 3010 to the first storage device 3100 by repeating operation S3102 and operation S3103. In an example embodiment, the first storage device 3100 may temporarily store the write data, which are included in the DOUT packet received from the host 3010, in a data buffer. The first storage device 3100 may store the write data of the data buffer in a nonvolatile memory device included in the first storage device 3100 or may transmit the write data of the data buffer to the second storage device 3200. In an example embodiment, the above-described transmission of write data may be similar to transmission of write data from the first storage device to the second storage device described with reference to FIGS. 1 to 11. That is, write data may be transmitted to the second storage device 3200 to improve the lifespan of the first storage device 3100, or for the improvement of write performance, write data may be transmitted to the second storage device 3200 based on whether a nonvolatile memory device is programmable.

For example, in operation S3201, the first storage device 3100 may transmit a second write command to the second storage device 3200. The second write command may not be a write command corresponding to a request of the host 3010, but it may be a write command for storing write data in the second storage device 3200 to improve the lifespan or performance of the first storage device 3100.

In operation S3202, the second storage device 3200 may transmit the RTT packet to the first storage device 3100 in response to the second write command.

In operation S3203, the first storage device 3100 may transmit the DOUT packet, in which the write data are included, to the second storage device 3200 in response to the RTT packet. In an example embodiment, the write data of operation S3203 may be write data that is stored in the data buffer of the first storage device 3100. If the write data stored in the data buffer of the first storage device 3100 are transmitted to the second storage device 3200 through the DOUT packet, the write data stored in the data buffer of the first storage device 3100 may be regarded as being stored, and thus a capacity of the data buffer may be secured.

In an example embodiment, write data may be transmitted from the first storage device 3100 to the second storage device 3200 by repeating operation S3202 and operation S3203.

In operation S3206, the second storage device 3200 may transmit a response to the first storage device 3100. The response of operation S3206 may be a response to the second write command of operation S3201. For example, the second storage device 3200 may transmit the response to the second write command to the first storage device 3100 when all write data associated with the second write command are received.

In operation S3106, the first storage device 3100 may transmit a response to the host 3010. The response of operation S3106 may be a response to the first write command of operation S3101. For example, the first storage device 3100 may transmit the response to the first write command to the host 3010 when all write data associated with the first write command are received.

Afterwards, in operation S3301, the first storage device 3100 may transmit a flush command to the second storage device 3200. The flush command may be a command for storing write data, which are stored in the second storage device 3200, of write data to be stored in the first storage device 3100 in the first storage device 3100.

In operation S3302, the second storage device 3200 may transmit a data-in (DIN) packet including write data to be stored in the first storage device 3100 to the first storage device 3100 in response to the flush command. In an example embodiment, operation S3302 may be repeated. In an example embodiment, the first storage device 3100 may store the write data included in the received DIN packet in a nonvolatile memory device included in the first storage device 3100.

If all the write data associated with the flush command are transmitted to the first storage device 3100, in operation S3303, the second storage device 3200 may transmit a response to the first storage device 3100.

In an example embodiment, the flowchart illustrated in FIG. 13 is a flowchart for describing some example embodiments of the inventive concepts. However, example embodiments of the inventive concepts may not be limited thereto. For example, operations illustrated in FIG. 13 may be performed to be overlapped and may not be limited to a sequence illustrated in FIG. 13. Also, operation S3201 to operation S3206 may be repeatedly performed at least twice or more while operation S3101 to operation S3106 are performed (a write data transfer operation corresponding to one write command is performed). That is, the first storage device 3100 may issue the second write command twice or more, based on whether to program is possible.

Also, an operation of transmitting write data from the second storage device 3200 to the first storage device 3100 may not be limited to an operation in which the second storage device 3200 transmits the DIN packet to the first storage device 3100 in response to the flush command. For example, to receive write data from the second storage device 3200, the first storage device 3100 may transmit the RTT packet to the second storage device 3200, and the second storage device 3200 may transmit the DOUT packet to the first storage device 3100 in response to the RTT packet.

Figure 14:
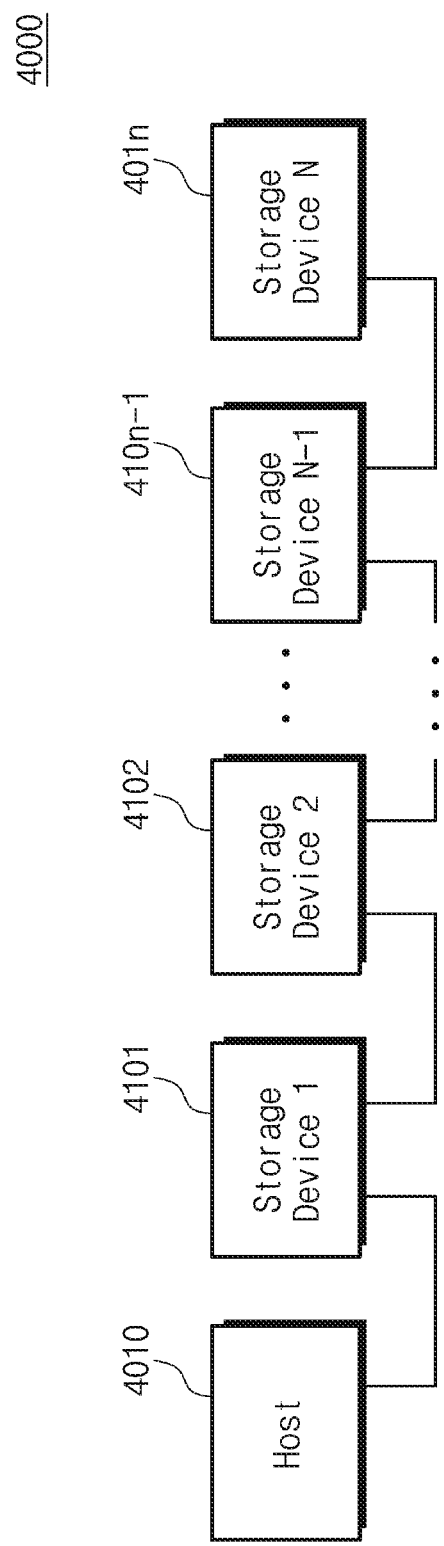
FIG. 14 is a block diagram illustrating a user device including serially connected storage devices, according to an example embodiment of the inventive concepts.

FIG. 14 is a block diagram illustrating a user device 4000 including serially connected storage devices, according to an example embodiment of the inventive concepts. Referring to FIG. 14, the user device 4000 may include a host 4010 and a plurality of storage devices 4101 to 410*n* connected in serial with the host 4010. In an example embodiment, each of the storage devices 4101 to 410*n* may be a first or second storage device described with reference to FIGS. 1 to 13.

The storage devices 4101 to 410*n* may be serially connected to each other through input/output ports thereof. Each of the storage devices 4101 to 410*n* may be directly connected with a storage device(s) adjacent thereto and may be indirectly connected with the remaining storage devices other than the directly connected storage device(s). For example, the first storage device 4101 may be directly connected with the second storage device 4102 and may be indirectly connected with the n-th storage device 410*n*. In other words, the first storage device 4101 may be connected with the n-th storage device 410*n* through the second to (n−1)-th storage devices 4102 to 410(*n*−1). According to the above description, the plurality of storage devices 4101 to 410n may be connected to each other in the chain structure. In an example embodiment, each of the plurality of storage devices 4101 to 410n may operate according to an operating method described with reference to FIGS. 1 to 12.

According to an example embodiment of the inventive concepts, a storage device may store write data received from a host in another storage device to improve write performance and lifespan. Accordingly, it is possible to provide a storage device having improved performance and lifespan, a user device including the storage device, and an operating method of the user device.

The units and/or modules described herein may be implemented using hardware components and hardware executing software components. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

While the inventive concepts has been described with reference to exemplary example embodiments, it will be apparent to those skilled in the art that various changes and modifications may be made without departing from the spirit and scope of the inventive concepts. Therefore, it should be understood that the above example embodiments are not limiting, but illustrative.

What is claimed is:
1. A storage device comprising:
a nonvolatile memory device; and
a controller configured to,
communicate with a host through a first port,
communicate with an external storage device through a second port,
control the nonvolatile memory device based on first mapping information,
receive second mapping information from the external storage device,
receive first write data from the host, and
selectively transmit the first write data to the external storage device based on the second mapping information.
2. The storage device of claim 1, wherein a first logical address of the first write data is allocated, by the host, such that the first logical address corresponds to a storage area of the first storage device.
3. The storage device of claim 1, wherein, the first mapping information comprises correspondence information between logical addresses managed by the host and first physical addresses of the nonvolatile memory device, and
the second mapping information comprises correspondence information between the logical addresses and second physical addresses of a nonvolatile memory device in the external storage device.
4. The storage device of claim 3, wherein the controller is configured to transmit,
at least one physical address of the second physical addresses, and
the first write data to the external storage device based on the second mapping information.
5. The storage device of claim 3, wherein the controller is configured to update the second mapping information after transmitting the first write data to the external storage device.
6. The storage device of claim 1, wherein the controller is configured to transmit the first write data to the external storage device when the nonvolatile memory device is operating.
7. The storage device of claim 1, wherein the controller is configured to,
read the first write data stored in the external storage device, during an idle time, based on the second mapping information, and
store the read first write data in the nonvolatile memory device.
8. The storage device of claim 1, wherein the controller is configured to read the first write data stored in the external storage device based on the second mapping information and to store the read first write data in the nonvolatile memory device, if a size of the first write data stored in the external storage device is greater than or equal to a reference size.
9. The storage device of claim 1, wherein the controller comprises a data buffer that temporarily stores the first write data, and
wherein the first write data is released from the data buffer after the first write data is transmitted to the external storage device.
10. The storage device of claim 1, wherein the controller is configured to receive second write data from the host after transmitting the first write data to the external storage device.
11. The storage device of claim 1, wherein the controller is configured to communicate with the host based on a universal flash storage (UFS) interface.
12. A storage system comprising:
a host;
a first storage device including a first nonvolatile memory device, the first storage device configured to communicate with the host through first ports; and
a second storage device including a second nonvolatile memory device, the second storage device configured to communicate with the first storage device through second ports,
wherein,
the first storage device is configured to receive first write data from the host and to transmit the received first write data to the second storage device,
the second storage device is configured to store the received first write data, and
a first logical address of the first write data is allocated, by the host, such that the first logical address corresponds to a first storage area of the first storage device.
13. The storage system of claim 12, wherein the first storage device is an embedded storage device and the second storage device is a card storage device.

14. The storage system of claim 12, wherein
the first storage device further includes:
   a first controller configured to control the first nonvolatile memory device based on first mapping information, and
the second storage device further includes:
   a second controller configured to control the second nonvolatile memory device based on second mapping information.

15. The storage system of claim 14, wherein
the first and second controllers are configured to exchange the first and second mapping information with each other.

16. A storage system comprising:
   a first storage device including,
      a first nonvolatile memory device, and
      a first controller configured to,
         control the first nonvolatile memory device based on first mapping information,
         receive second mapping information,
         receive first write data, and
         selectively transmit the first write data based on the second mapping information; and
   a second storage device including
      a second nonvolatile memory device, and
      a second controller configured to,
         control the second nonvolatile memory device based on the second mapping information,
         transmit second mapping information to the first storage device, and
         receive first write data selectively transmitted by the first storage device based on the second mapping information.

17. The storage system of claim 16, wherein a first logical address of the first write data is allocated, by a host, such that the first logical address corresponds to a first storage area of the first nonvolatile memory device.

18. The storage system of claim 16, wherein the second controller is further configured to store the first write data, received from the first controller, in the second nonvolatile memory device.

19. The storage system of claim 18, wherein the first storage device is further configured to:
   read the first write data from the second storage device, and
   store the first write data read from the second storage device in the first nonvolatile memory device.

20. The storage system of claim 16, wherein the first controller is configured to update the second mapping information after transmitting the first write data.

* * * * *